US012378112B2

(12) United States Patent
Baldwin et al.

(10) Patent No.: US 12,378,112 B2
(45) Date of Patent: Aug. 5, 2025

(54) HYDROGEN STORAGE MATERIAL

(71) Applicant: The Government of the United States of America, as represented by the Secretary of the Navy, Arlington, VA (US)

(72) Inventors: Jeffrey W. Baldwin, Fairfax Station, VA (US); James R. Morse, Arlington, VA (US); David A. Zugell, Pottstown, PA (US); Bernard R. Matis, Alexandria, VA (US); Heather D. Willauer, Fairfax Station, VA (US); Nicolas T Gangemi, Washington, DC (US); Brian Houston, Fairfax, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 662 days.

(21) Appl. No.: 16/926,178

(22) Filed: Jul. 10, 2020

(65) Prior Publication Data
US 2021/0009409 A1 Jan. 14, 2021

Related U.S. Application Data

(60) Provisional application No. 62/872,274, filed on Jul. 10, 2019.

(51) Int. Cl.
*C01B 3/00* (2006.01)
*B01J 3/04* (2006.01)
(Continued)

(52) U.S. Cl.
CPC .............. *C01B 3/0021* (2013.01); *B01J 3/04* (2013.01); *C01B 3/0084* (2013.01); *C01B 32/19* (2017.08);
(Continued)

(58) Field of Classification Search
CPC ... C01B 3/0021; C01B 3/0084; C01B 32/194; C01B 32/19; C01B 32/225; B01J 3/04;
(Continued)

(56) References Cited

U.S. PATENT DOCUMENTS

2003/0037551 A1 2/2003 Wolfe
2005/0118091 A1 6/2005 Cooper et al.
(Continued)

FOREIGN PATENT DOCUMENTS

WO WO-2005069922 A2 * 8/2005 ............. H01M 4/86

OTHER PUBLICATIONS

Graf, John, "Chlorate Oxygen Generator (Oxygen Candle) Review of the History of Candle Development to be Presented at Subs in Space", 2017. NASA-JSC, p. 1-15. (Year: 2017).*
(Continued)

*Primary Examiner* — Coris Fung
*Assistant Examiner* — Catriona M Corallo
(74) *Attorney, Agent, or Firm* — US Naval Research Laboratory; Joseph T. Grunkemeyer

(57) ABSTRACT

Disclosed is a method of: providing a hydrogenated $sp^2$ carbon allotrope, and releasing hydrogen gas from the carbon allotrope. The method may use an apparatus having: a vessel for containing the hydrogenated $sp^2$ carbon allotrope, a fuel cell capable of using hydrogen gas a fuel, and a tube for transporting hydrogen gas from the vessel to the fuel cell. The carbon allotrope may be made by: providing a mixture of an $sp^2$ carbon allotrope and liquid ammonia, adding an alkali metal to the mixture, and sonicating the mixture to form a hydrogenated form of the carbon allotrope. The hydrogenated carbon can be at least 3.5 wt % hydrogen covalently bound to the carbon.

14 Claims, 15 Drawing Sheets

(51) Int. Cl.
    *C01B 32/19*     (2017.01)
    *C01B 32/194*     (2017.01)
    *C01B 32/225*     (2017.01)
    *H01M 8/0612*     (2016.01)

(52) U.S. Cl.
CPC .......... C01B 32/194 (2017.08); C01B 32/225 (2017.08); H01M 8/0631 (2013.01); *C01P 2002/72* (2013.01); *C01P 2002/82* (2013.01); *C01P 2002/88* (2013.01); *C01P 2002/89* (2013.01)

(58) Field of Classification Search
CPC .............. H01M 8/0631; C01P 2002/72; C01P 2002/82; C01P 2002/88; C01P 2002/89
USPC ...................................................... 423/658.2
See application file for complete search history.

(56) References Cited

U.S. PATENT DOCUMENTS

2011/0000781 A1      1/2011      Krishna et al.
2016/0181633 A1      6/2016      Wu et al.

OTHER PUBLICATIONS

Murata et al. "Tuning Hydrogen Adsorption on Graphene by Gate Voltage". J. Phys. Chem. C 2018, 122, p. 11591-11597. (Year: 2018).*

Bulat et al., "Hydrogenation and Fluorination of Graphene Models: Analysis via the Average Local Ionization Energy" J. Phys. Chem. A 2012, 116, 8644-8652.
Burgess et al., "Tuning the electronic properties of graphene by hydrogenation in a plasma enhanced chemical vapor deposition reactor" Carbon, 49(2011), 4420-4426.
Matis et al., "Surface Doping and Band Gap Tunability in Hydrogenated Graphene" ACS Nano, 6(1), 17-22 (2012).
Matis et al., "Evidence for Spin Glass Ordering Near the Weak to Strong Localization Transition in Hydrogenated Graphene" ACS Nano, 2016, 10, 4857-4862.
Matis et al., "Giant negative magnetoresistance and a transition from strong to weak localization in hydrogenated graphene" Phys. Rev. B, 85, 195437 (2012).
Matis et al., "Low-energy resonant scattering from hydrogen impurities in graphene" Phys. Rev. B, 88, 085441 (2013).
Matis et al., "Influence of spatial inhomogeneity on electronic and magnetotransport in graphene" Phys. Rev. B, 97, 205406 (2015).
Matis et al., "Chemically functionalized graphene for bipolar electronics" Appl. Phys. Lett. 102, 103114 (2013).
Zottel et al., "Hydrogen storage in carbon nanostructures" International Journal of Hydrogen Energy 2002, 27, 203-212.
Jena, "Materials for Hydrogen Storage: Past, Present, and Future" J. Phys. Chem. Lett., 2011, 2, 206-211.
Zhang et al., "Powder properties of hydrogenated ball-milled graphene" 2014, 60, 648-651.
Pumera et al., "Graphane and hydrogenated graphene" Chem. Soc. Rev., 2013, 42, 5987.
Search Report and Written Opinion in PCT/US2020/041650 (Nov. 4, 2020).
Whitener "Review Article: Hydrogenated graphene: A user's guide" J. Vac. Sci. Technol. A 36(5), Sep./Oct. 2018.

* cited by examiner

HYDROGEN STORAGE MATERIAL

This application claims the benefit of US Provisional Application No. 62/872,274, filed on Jul. 10, 2019. The provisional application and all other publications and patent documents referred to throughout this nonprovisional application are incorporated herein by reference.

TECHNICAL FIELD

The present disclosure is generally related to hydrogen storage and release.

DESCRIPTION OF RELATED ART

Rechargeable lithium ion batteries represent the current state of the art in storing and supplying power for consumer electronics, stationary storage applications, military applications, and the transportation industry (Nayak et al., *Chem. Int. Ed.* 2018, 57, 102-120; Thackeray et al., *Energy Environ. Sci.* 2012, 5, 7854-7863). Depending on the application the gravimetric energy density of these batteries range from 0.030 to 0.300 kWh/kg (Nayak).

With respect to transportation and military applications, hydrogen fuel cell technology has the potential to provide more than 50 times the energy density of lithium ion batteries (Table 1) (Coffey et al., *Defense Horizons* 2003, 36, 1-11; Aakko-Sakas et al., *Journal of Power Sources* 2018, 396, 803-823). This translates into extended operational duration. Unfortunately any mobile hydrogen fuel cell application is limited by the low volumetric storage densities of hydrogen (Table 1) along with the ability to produce hydrogen as an energy carrier (Coffey; Aakko-Sakas; Jena, *J. Phys. Chem. Lett.* 2011, 2, 206-211). Globally hydrogen is almost entirely produced from fossil fuels and used as feedstock within the refining and chemical industries (Aakko-Sakas; van der Hoeven "Technology Roadmap Hydrogen and Fuel Cells" International Energy Agency 2015, 1-75. www.iea.org).

Table 1 provides the energy content (versus mass and volume) of commonly used fuel and how it compares to hydrogen stored over a range of temperatures and pressures (Nayak; Coffee; Aakko-Sakas; Jena; van der Hoeven; Zuttel, *Materials Today*, September 2003, 24-33; Cadwallader et al., "Safety Issues with Hydrogen as a Vehicle Fuel," Idaho National Engineering and Environmental Laboratory, INEEL/EXT-99-00522 September 1999). Most commercial transportation hydrogen storage applications involve the compression of hydrogen from 10,000-15,000 psi to increase the volumetric energy density of the fuel (Table 1) (van der Hoeven; Zuttel; Cadwallader; Office of Energy Efficiency & Renewable Resources Fuel Cell Technologies Office https://energy.gov/eere/fuelcells/materials-based-hydrogen-storage (accessed November 2018)). The USAF and NASA liquefy hydrogen~20 K to use as rocket fuel (Cadwallader). Each of these hydrogen storage methods requires heavy pressure vessels, leak detectors, and pressure and temperature controls (Cadwallader).

TABLE 1

Energy Content of Common Fuels

| Fuel | Energy Density of Fuel by Weight (kWh/kg) | Density of Fuel by Volume (g/L) | Energy Density of Fuel by Volume (kWh/L) |
|---|---|---|---|
| Gasoline | 12.9 | 720 | 9.2 |
| JP5 | 11.9 | 840 | 10 |
| Metal hydride | 33.3 | 111 | 3.70 |

TABLE 1-continued

Energy Content of Common Fuels

| Fuel | Energy Density of Fuel by Weight (kWh/kg) | Density of Fuel by Volume (g/L) | Energy Density of Fuel by Volume (kWh/L) |
|---|---|---|---|
| $MgH_2$ | | | |
| Hydrogen Gas | 33.3 | 0.0899 | 0.003 |
| Hydrogen Gas (3000 psi) | 33.3 | 17 | 0.566 |
| Hydrogen Gas (10,000 psi) | 33.3 | 38 | 1.26 |
| Liquid Hydrogen | 33.3 | 71 | 2.36 |
| Lithium Ion Batteries | 0.300 | 2300 | 0.700 |

There are many safety issues with hydrogen stored as compressed gas and liquid. Hydrogen's flammability, low ignition energy, embrittlement of materials, and ability to leak from confinement (tanks, piping, seals) raise concerns of possible hydrogen-air fires that burn rapidly with no visible indication of flames or smoke (van der Hoeven; Zuttel; Cadwallader). The implodable volume of the hydrogen storage tanks adds another level of risk for various transportation and military applications. The implosive collapse of a gas-filled structure can lead to ultrahigh compressions and strong shock waves, which pose a real threat to any nearby assets. With the increased investment in military and commercial hydrogen fuel cell powered systems, the development of inexpensive, high-density, user friendly, safe, pressure-tolerant solid hydrogen storage material would be a game-changing energy solution for terrestrial and underwater system applications (Office of Energy Efficiency & Renewable Resources Fuel Cell Technologies Office; Yu et al., *Progress in Materials Science* 2017, 88, 1-48.

Considerable research has focused on improving the volumetric and gravimetric storage density of hydrogen using materials such physisorbed hydrogen onto numerous materials (Graphite and metal organic frameworks (MOFs)), as well as ball-milling of carbon materials, and hydrides (Jena; Yu; Zutel et al., *International Journal of Hydrogen Energy* 2002, 27, 203-212; Zhang et al., *Materials Research Bulletin* 2014, 60, 648-651. MOFs can be challenging to synthesize, unstable, and contain low percentages of hydrogen by weight. Similarly physisorbed hydrogen onto graphite and other material exhibit low storage densities. Table 2 shows that hydrides could be promising candidates for hydrogen storage as they exhibit higher storage densities than gas and liquid storage (Jena; Zuttel). However hydrides face other challenges as many are unstable and difficult to synthesize, recharge, and dehydrogenate (Jena; Zuttel; Ren et al., *J. Phys. Chem C* 2014, 118, 21778-21784.

TABLE 2

Hydrogen Storage in Selected Materials

| Material | Density of Material (g/L) | Density of Hydrogen by weight (%) | Density of Hydrogen by Volume (g/L) | Energy Density of Hydrogen by Volume (kWh/L) |
|---|---|---|---|---|
| $MgH_2$ | 1450 | 7.69 | 111 | 3.70 |
| $LiAlH_4$ | 917 | 10.54 | 97 | 3.22 |
| $NaBH_4$ | 1070 | 10.57 | 113 | 3.80 |
| $NaAlH_4$ | 905 | 7.41 | 67 | 2.23 |
| $Mg_2FeH_6$ | 2740 | 5.47 | 150 | 5.47 |
| Graphane | 1750 | 7.74 | 135 | 4.50 |

BRIEF SUMMARY

Disclosed herein is a method comprising: providing a hydrogenated sp2 carbon allotrope, and releasing hydrogen gas from the carbon allotrope.

Also disclosed herein is an apparatus comprising: a vessel for containing a hydrogenated $sp^2$ carbon allotrope, a fuel cell capable of using hydrogen gas a fuel, and a tube for transporting hydrogen gas from the vessel to the fuel cell.

Also disclosed herein is a hydrogenated $sp^2$ carbon allotrope comprising at least 3.5 wt % hydrogen covalently bound to the carbon allotrope.

Also disclosed herein is a method comprising: providing a mixture comprising an $sp^2$ carbon allotrope and liquid ammonia, adding an alkali metal to the mixture, and sonicating the mixture to form a hydrogenated form of the carbon allotrope.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
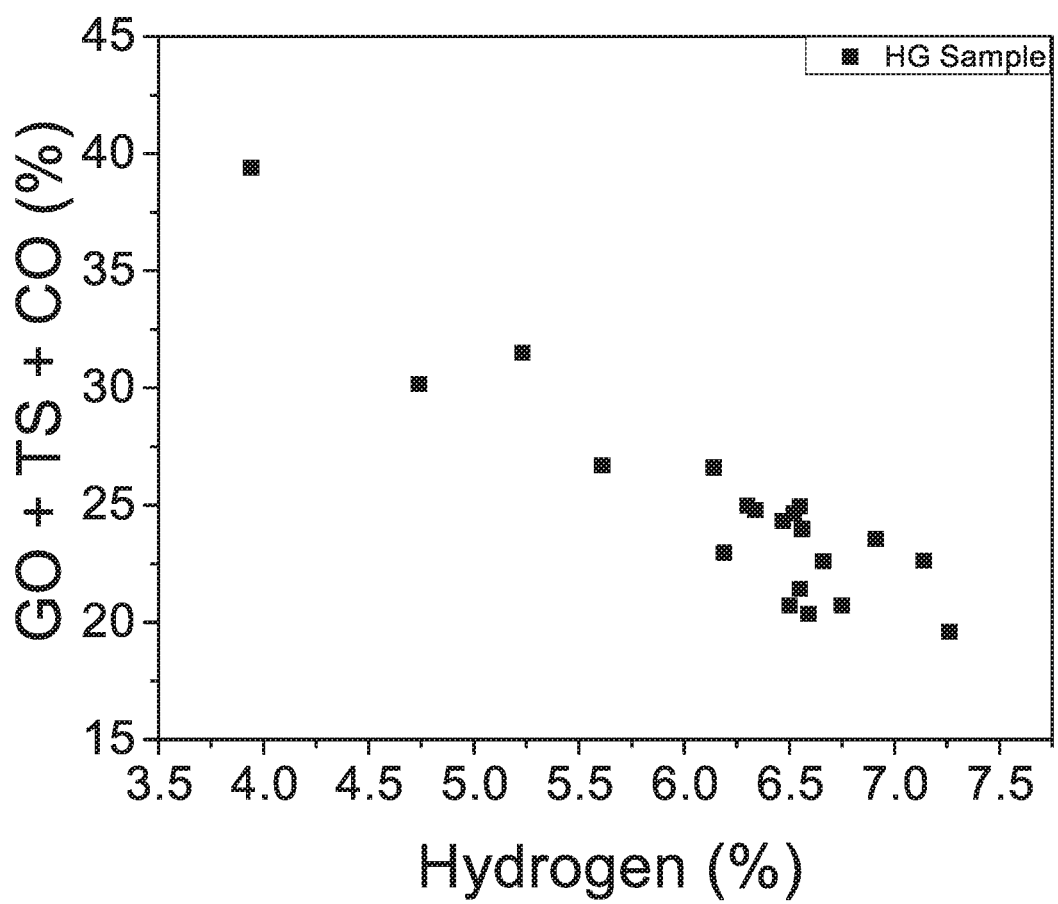
FIG. 1 shows percent of GO+TS+CO (contaminants) vs. percent hydrogen. The percentages were quantified by TGA-MS. All samples were synthesized with water as the proton source and were preheated under vacuum to 220° C.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

A candidate for improving solid-state hydrogen storage is the inert, stable, and two-dimensional (2D) material, hydrogenated graphene (graphane) and similar hydrogenated $sp^2$ allotropes of carbon. This solid-state platform is ultra-lightweight, and offers the high gravimetric hydrogen concentration of graphane (7.74% wt) and volumetric density needed for a viable future energy storage technology (Tables 1 and 2). Development of such a technology requires the capability to hydrogenate graphene in the gram/kilogram quantities, as well as to efficiently and optimally extract the hydrogen gas on demand from the material in a storage vessel. Though chemical methods capable of producing milligram quantities of hydrogenated graphene (HG) have been shown to produce hydrogenated material near the theoretical limit of 7.74% hydrogen by weight (Pumera et al., *Chem. Soc. Rev.* 2013, 42, 5987-5995), little attention has been paid to ascertaining the mechanism(s) governing the release of the stored hydrogen from the HG matrix. Furthermore, although prior works have studied the kinetics of desorption of covalently bound hydrogen thermally released from few-layer graphene at 220° C. (Matis et al., *ACS NANO* 2012, 6, 17-22), the demonstration of using this type of material for a process to produce high-density hydrogen storage material for the controlled thermal delivery of molecular hydrogen ($H_2$) as a source for power, energy, and chemical synthesis applications has not been shown.

Covalently hydrogenated graphene, otherwise known as graphane $(CH)_n$, is stable in air up to temperatures of about 400° C., above which, it thermally decomposes to liberate gaseous $H_2$. In addition, hydrogen stored within graphane would possess a volumetric energy density on the order of 135 g $L^{-1}$, roughly three times greater than hydrogen gas pressurized to 10,000 PSI. Like graphene, chemically pristine graphane is challenging to isolate, however, various carbon allotropes can be chemically hydrogenated to yield a similar product. The large theoretical hydrogen density (on both a per mass and per volume basis), coupled with the straightforward release of $H_2$ by thermal triggering, makes hydrogenated graphene a promising material for high-density, solid-state hydrogen storage.

To date, the study of hydrogenated graphene has been mostly academic in nature. Published syntheses describe yields on the sub-gram scale, and previous studies have only demonstrated "proof of concepts". Furthermore, at these scales, it can be challenging to accurately quantify the degree of graphene hydrogenation. In order for hydrogenated graphene to be realized as a practical hydrogen storage medium, large-scale tests under realistic operating conditions should be performed. Additionally, the macroscale quantities of hydrogen gas generated during such tests would enable straightforward calculation of the material's $H_2$ storage capacity.

Previously hydrogenated graphene has been produced by other methods. These methods have resulted in incomplete hydrogenated with a number of contaminates. These contaminates have been identified as bound oxygen producing graphene oxide as well as unbound contaminates such as trapped bases (hydroxides and carbonates). Molecular oxygen is 16 times heavier than hydrogen causing the percent hydrogenation of graphene not only to be reduced for every bound oxygen atom there is one less potential carbon to bind hydrogen to, but also the total mass by weight of hydrogen to be dramatically reduced. This is illustrated in FIG. 1 comparing the percent hydrogenation to the percent of other contaminates (graphene oxide, trapped solvent, hydroxides, and carbonates). As the containments increase in percentage the percent by weight of hydrogen decreases. These previously unknown contaminates have limited the success of hydrogenated graphene.

Disclosed herein is the synthesis of hydrogenated graphene in multi-gram quantities using a scaled-up Birch reduction. With this material, large-scale, and on-demand, $H_2$ generation is demonstrated using a high-pressure reaction vessel. From this experimental setup, a fuel cell is then operated using $H_2$ gas generated exclusively from the hydrogenated graphene, demonstrating the successful application of this material as a fuel source. The gas generated in these experiments consisted of 90% $H_2$ by volume, with the remainder corresponding to $NH_3$, $H_2O$, and $CH_4$. The volume of $H_2$ generated in these experiments corresponded to a hydrogen loading capacity of 3.2 wt. %, roughly 42% of the theoretical value of graphane. The results presented herein demonstrate multi-gram quantities of hydrogenated graphene can be used to safely generate practical quantities of $H_2$ gas on demand.

The methods disclosed herein can be used with any $sp^2$ carbon allotrope, such as graphite, graphene, fullerenes, and carbon nanotubes. Graphene generally refers to single sheets of graphite. As used herein, the terms may be used interchangeably. The terms graphane and hydrogenated graphene may be used interchangeably. All methods using graphene/graphite are equally applicable to other $sp^2$ carbon allotropes. The term "hydrogenated $sp^2$ carbon allotrope" refers to the presence of hydrogen atoms covalently bonded to what had been $sp^2$ carbons atoms, but which have become $sp^3$ carbon atoms.

The carbon is hydrogenated by first forming a mixture of the carbon in liquid ammonia. Optionally, the mixture is sonicated to help disburse the carbon. Then an alkali metal such as lithium is added and the mixture sonicated. The second and optional first sonications can help to increase the percent hydrogenation. A proton source such as water or an alcohol is then added to start the hydrogenation reaction.

Optionally, an acid may be added to purify the product. The acid concentration should not be so high as to dehydrogenate the product. The solid hydrogenated carbon is than filtered from the mixture. This process can produce a product having at least 3.5, 4.0, 4.5, 5.0, 5.5, 6.0, 6.5, 7.0, or 7.5 wt. % hydrogen. The theoretical maximum of 7.74% hydrogen implies one hydrogen atom bonded to every carbon atom, regardless of the specific allotrope used.

The hydrogenated carbon may then be placed in a vessel having a tube leading to a hydrogen fuel cell. A variety of methods may be used to remove the hydrogen from the carbon to make hydrogen gas. The vessel may be a pressure vessel that is heated externally. A heat source inside the vessel, such as a chlorate candle may be used. In another embodiment, microwave irradiation can be used. In yet another embodiment, instead of heat a chemical method is used to remove the hydrogen. For example, concentrated sulfuric acid and concentrated nitric acid may be used. In any of these methods, the rate of hydrogen release may be controlled by controlling the amount of heat, radiation, or chemical applied to the material.

The generated hydrogen is then directed through the tube and into the fuel inlet of the fuel cell. Optionally, the gas may be passed through a carbon filter to remove impurities.

An advantage to this material is that the volumetric and gravimetric storage capacity for hydrogen can be increased beyond the state of the art to 7.7% by weight and 170 g/L volumetrically. It also increases the safety of stored hydrogen, eliminates the need for heavy pressure vessels for hydrogen storage, and the material will have no implodable volume.

The following examples are given to illustrate specific applications. These specific examples are not intended to limit the scope of the disclosure in this application.

The first step in this process is to demonstrate the production of gram/kilogram quantities of HG, including all hydrogenated $sp^2$ allotropes of carbon that approaches the theoretical limit for storing hydrogen chemically bound to the carbon lattice at 7.74% by weight. In the preparation of HG, graphite is exfoliated using ultrasonic wave pulses. These waves can be introduced via an external bath or internal probe sonicator. The sonication is applied for a given amount of time to the graphite before and after the addition of alkali metals (lithium, sodium, potassium, rubidium, cesium, or francium).

Unless otherwise noted, all materials were used as purchased. Graphite (powder, <20 μm, synthetic) was purchased from Sigma Aldrich. Methanol (certified ACS) and hydrochloric acid (certified ACS plus) were purchased from Fischer Scientific. Lithium (granules, 99% metals basis) was purchased from Alpha Aesar. Liquefied ammonia (anhydrous) was purchased from Matheson.

Warning: The Birch reduction requires the use of liquid ammonia and alkali metals, both of which present significant safety risks. This reaction should only be performed by adequately trained personnel, and extreme care should be exercised while carrying out this reaction at any scale. Furthermore, in order to generate large quantities of material, the scale of reagents used in this synthesis are over an order of magnitude larger than described in similar reports. Whenever possible, smaller scale reactions should be carried out.

A representative multi-gram scale synthesis begins with 18 1.5 L of ammonia condensed into a 3 L five arm flask, submerged in a dry ice acetone bath (~−76° C.) under a nitrogen ($N_2$) or argon atmosphere. A condensing column is also filled with dry ice/acetone and included in the reaction setup. The reaction is mechanically stirred (~60 rpm). Approximately 75 g of graphite is added, and then the solution is sonicated over an extended period of time with a Qsonica Q700 (120V) sonication horn. After sonication, ~55 g Li pellets are added at a stoichiometric ratio of approximately 1.25:1 Li:C. After the addition of the alkali metal the solution is sonicated for an extended period of time. A proton source (water, methanol (MeOH), ethanol (EtOH), and or tert-butyl alcohol (TBA)) is added via a syringe pump at a molar ratio of 1.25 proton source to Li. The reaction is left for approximately 12 hours to warm to room temperature and allow the $NH_3$ to evaporate. The resulting solid HG material was suspended in a solution of water. Acid (hydrochloric acid, phosphoric acid, acetic acid,) is added to the solution until the solution is slightly acidic (pH ~6). Note, at high concentrations, acids capable of oxidation such as nitric and sulfuric acids have been observed to strip chemically bound hydrogen from the material. Hexanes are added to the HG solution and the solution is transferred to in a separatory funnel. The sample is washed further with water until the pH of the solution is ~7. The HG is dried in a vacuum oven at 220° C. for ~24 hours.

Figure 2:
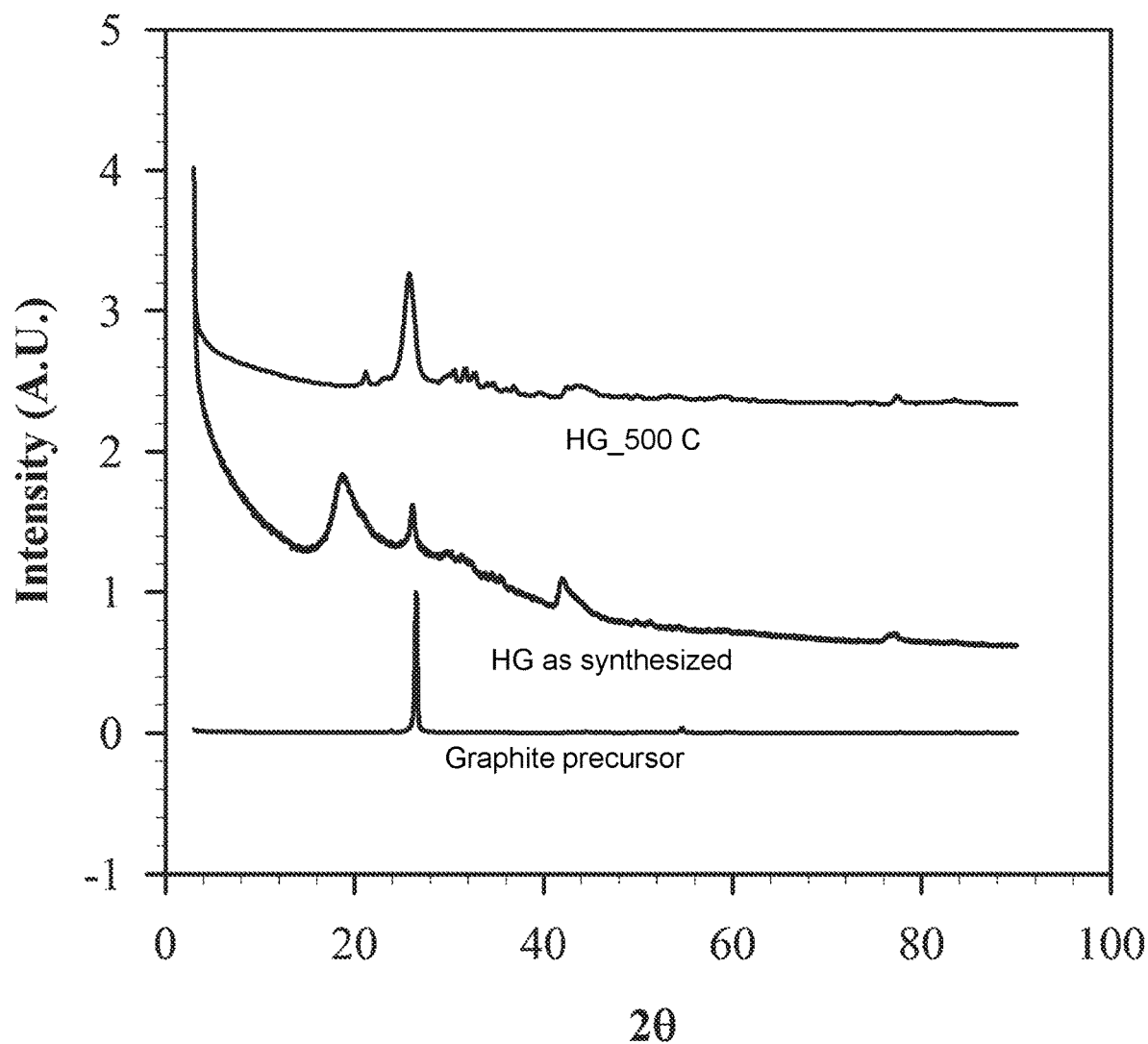
FIG. 2 shows powder X-ray diffraction patterns of graphite precursor compared to the HG sample.

X-Ray Diffraction (XRD) measurements were performed on a Rigaku Smartlab X-ray diffractometer using Cu Kα monochromatized radiation operated at 44 kV and 40 mA at room temperature over the range of 10-90° 2θ. FIG. 2 compares the powder X-ray diffraction patterns of graphite precursor to the HG sample. Li is the alkali metal and methanol is the proton source used in the synthesis of the HG. The XRD patterns demonstrate the material is hydrogenated after the synthesis by the characteristic shift and broadening of the (002) reflection of graphite from 26.6 to 18.8° 2θ. This shift is indicative of an increase in the d-spacing between the carbon sheets due to hydrogenation of the carbon lattice, while the broadening demonstrates exfoliation of the original layered structure. The HG sample still has a peak at 2θ=26.6° indicating non-hydrogenated graphite portions are still present after the large scale synthesis of the hydrogenated graphite. After the HG is heated to 550° C., the (002) reflection is again observed exclusively at 2θ=26.6° confirming all the hydrogen is removed and only the graphite precursor remains. Sharp peaks within the range of 29 to 41° 2θ, are indicative of $Li_2CO_3$ and LiOH ($H_2O$) phases. This demonstrates that significant Li based contaminants persist after the synthesis of the HG material. The increased signal intensity of these reflections in the leftover graphite precursor is most likely due to thermally induced ripening of smaller or less crystalline lithium contaminants in the starting HG material. These findings are significant as contaminants trapped between the layers of the hydrogenated carbon lattice significantly impact the gravimetric and volumetric density of the material. The oxygen atom is 16 times heavier than the hydrogen atom and the addition of these atoms to the graphene matrix in the form of hydroxides and carbonates increases the overall weight of the material, limiting the material's ability to be used as a hydrogen fuel source.

The TGA-MS experimental setup consisted of a Q500 TGA (TA Instruments) connected to a HPR-20 benchtop mass spectrometer (Hiden Analytical). Approximately 15 mg of sample was added to an alumina boat, which was then purged with Ar gas for 90 minutes at a flow rate of 200 mL $min^{-1}$ at room temperature, and then heated to 975° C. at a rate of 5° C. $min^{-1}$. Volatile products generated in the TGA furnace were introduced to the mass spectrometer operating at 70 eV using a scanning range of 2 to 120 m/z to determine the most prominent species. An ionization of 16 eV was used to detect m/z 16 in order to differentiate the signature from $H_2O$ and $NH_3$ contributions. All other all other ions were detected using an ionization energy of 70 eV.

Calibration of the mass spectrometer was achieved using response factor values determined from a blend of $N_2$, $CO_2$, CO, $H_2$, and $CH_4$ of known composition. MS calibration for $H_2O$ and $NH_3$ vapors were performed using an $N_2$ stream saturated in the respective vapors, with response factors calculated using tabulated vapor pressures of the respective gases.

The quantity and composition of gaseous species generated from the thermal decomposition of hydrogenated graphite samples were identified using a 0.6 L Parr pressure reactor (Parr 4760 HP/HT) plumbed to a calibrated mass spectrometer.

Figure 3:
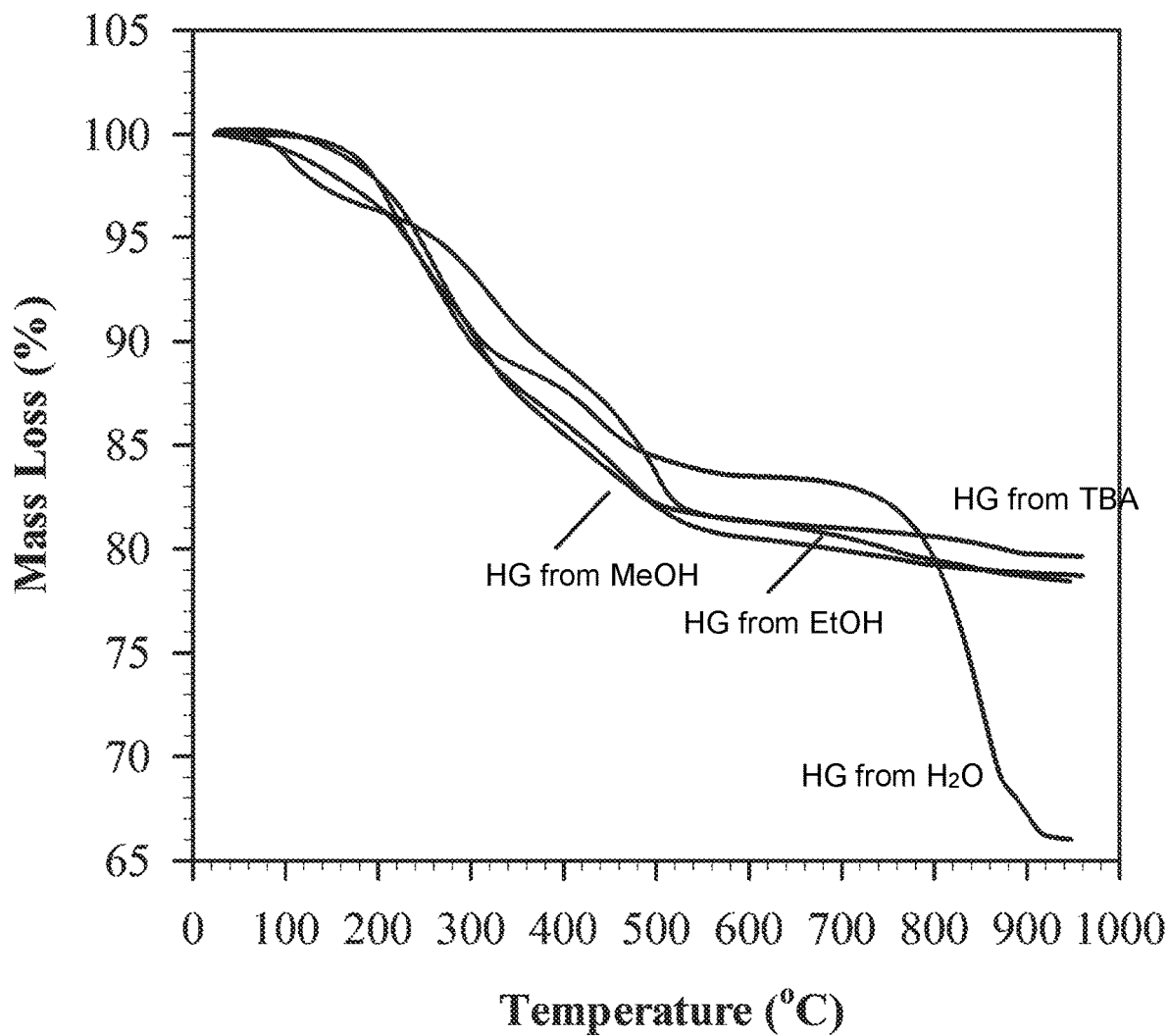
FIG. 3 shows HG produced using different proton sources. TGA graph of HG produced using TBA, MeOH, EtOH and, $H_2O$ (from top to bottom of right-hand edge of plot).
Figure 4:
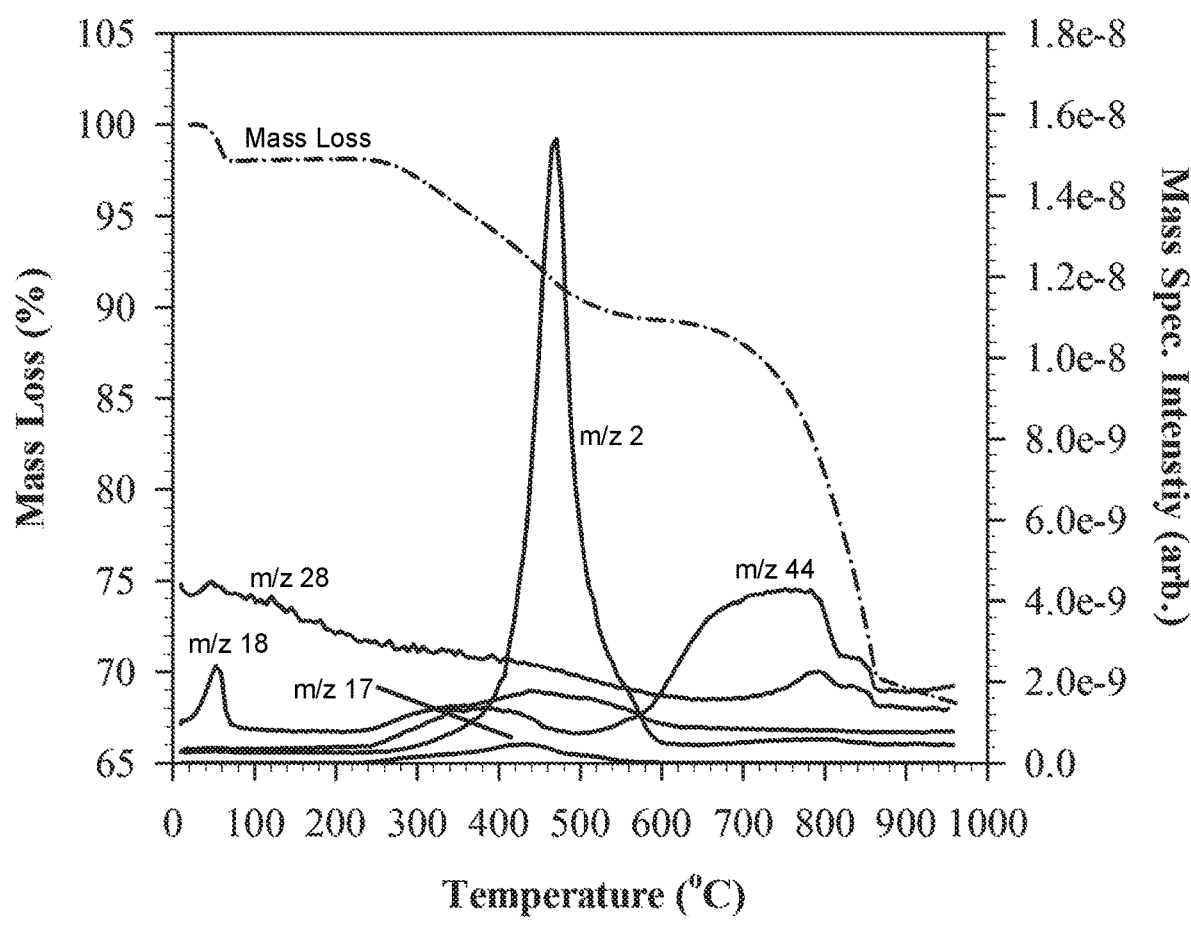
FIG. 4 shows TGA-MS of HG synthesized showing all major MS peaks.

FIG. 3 shows thermogravimetric analysis (TGA) data of the HG produced from different proton sources. These samples were initially preheated in a vacuum oven to ~220° C. to remove trapped water and solvents. The samples were heated at 5° C./minute to 975° C. under a flow of Ar gas. The weight loss curves for the HG material produced by the different proton sources have similar weight loss trends. FIG. 4 provides the analysis of the weight loss curve by an in-line mass spectrometer for an HG sample produced using methanol as the proton source. The normalized mass spectrometer signal as a function of temperature identifies the species responsible for the weight loss. The mass loss between 25-100° C. is attributed to water adsorbed by the material after removal from the vacuum oven. The mass loss between 375 and 550° C. is primarily the evolution of hydrogen from the carbon lattice. Masses corresponding to ammonia and water (M/Z 17 and M/Z 18, respectively) are also seen in this temperature region and most likely correspond to oxygen and nitrogen containing functional groups that are also bound to the carbon lattice and liberated in this temperature range. The evolution of carbon dioxide (M/Z 44) and carbon monoxide (MZ 28) from the sample begins around 550° C. and continues until the temperature ramp is completed. Additionally, significant mass loss is observed throughout this temperature range. This behavior is consistent with the decomposition of Li-species.

FIGS. 2 and 4 suggest other species are present in the hydrogenated material, either as chemically bound functional groups, or as alkali-based contaminates adsorbed to the HG material. Such species would have a negative impact on the gravimetric and volumetric density of the HG material. To minimize the presence of these contaminating species, the following post synthetic treatments of HG were developed.

The as synthesized HG is heated under vacuum to 350° C., held for 1 hour, and then cooled to room temperature. The subsequent material is thus thermally stable up to 350° C. under inert atmospheres, and contains a greater percent loading of hydrogen by mass.

Li species were found to persist in the as synthesized hydrogenated graphite (FIG. 2), which resulted in significant mass loss at temperatures above 700° C. (FIG. 4). Contamination from residual alkali metals in chemically hydrogenated graphite has been acknowledged by some authors (Bousa, et al., *RCS Adv.*, 2016, 6, 6475-6485; Schafer et al., *Angew. Chem. Int. Ed.* 2013, 52, 754-767), however, the majority of reports do not include mention of such contamination. The scaling up of the synthesis of hydrogenated graphite may contribute to greater quantities of alkali contamination, but it is also possible alkali contamination has been overlooked in previous reports.

In order to maintain the chemically bound hydrogen, impurities that decompose at temperatures above 350° C. (such as Li species) must be removed by means other than thermal treatment. The following procedures were applied in an attempt to remove residual Li species:

Approximately 300 mg of hydrogenated graphite was finely ground, then added to 100 mL concentrated HCl and stirred overnight. The following day, the solution was diluted with 1,000 mL deionized water and dried via vacuum filtration. The material was rinsed with deionized water two more times. The effluent of the final rinse was tested with pH paper and found to be neutral, confirming no substantial quantity of HCl persisted in the washed material. For comparison, the same acid washing procedure outlined above was performed using 100 mL of 1M HCl.

Figure 5:
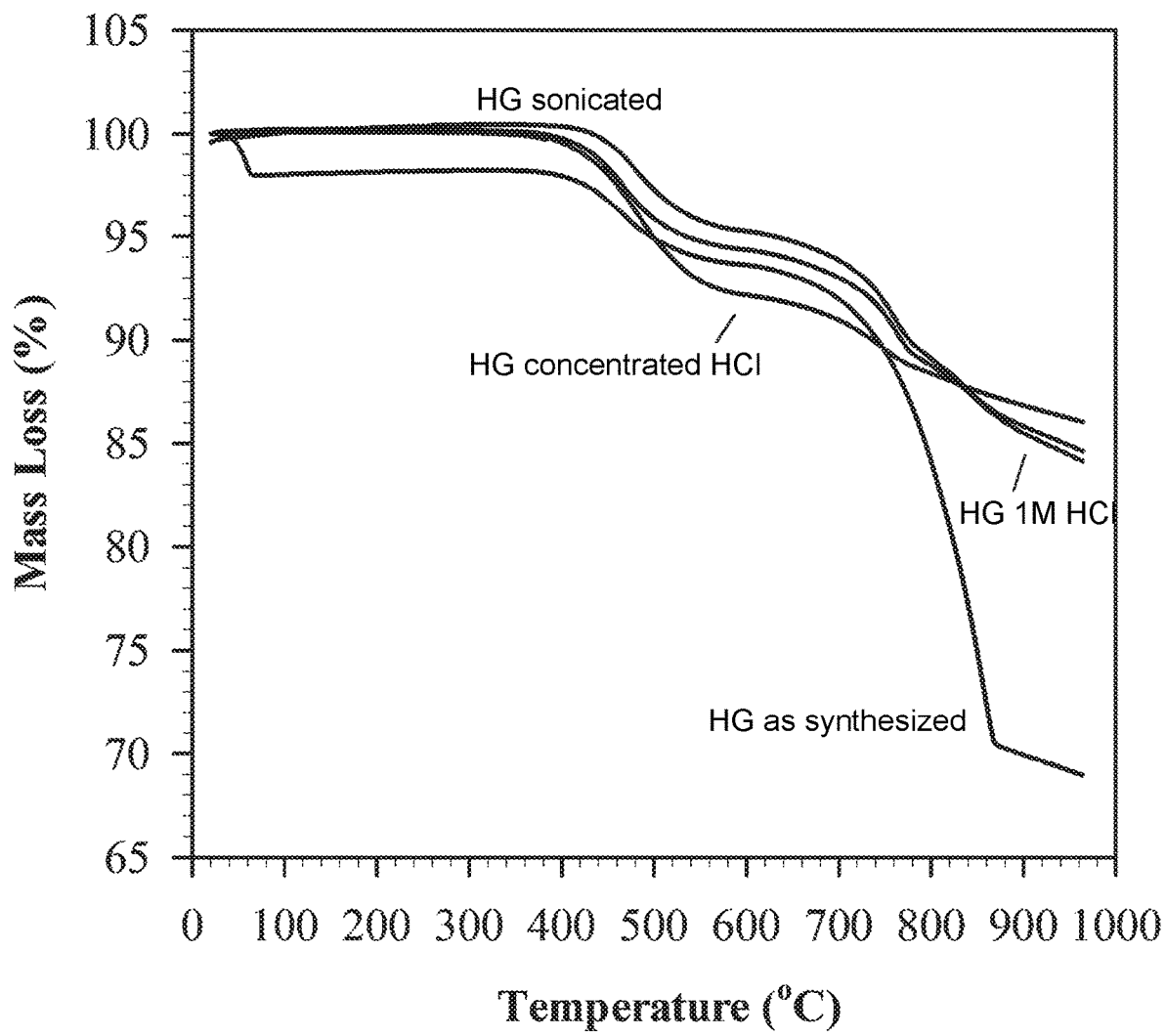
FIG. 5 shows a TGA graph of pre and post treated HG samples with HCl.

FIG. 5 compares the TGA data of the untreated and post treated HG samples. All samples were held under vacuum at 350° C. for one hour to remove low temperature contaminates. The post treatment samples show significant reduction in mass loss at temperatures above 600° C. indicating a large fraction of the alkali metal is removed using these methods. However, for every method evaluated, some degree of mass loss was still observed above 600° C. Stirring the material in concentrated HCl overnight yielded the most optimal results, however, the other described methods also provided significant removal of alkali contaminates.

In a typical experiment, a known mass (about 3-6 g) of hydrogenated graphene was added to the reactor, which was then sealed. The volume occupied by the sample was considered negligible relative to the total reactor volume, and was not considered in the subsequent calculations. The atmosphere of the reactor was evacuated over the course 0.5 hours using a connected vacuum pump. After 0.5 hours, the valve connecting the vacuum pump was closed, isolating the reactor. The reactor was then heated to 600° C. to fully liberate the chemically bound hydrogen from the sample, and held for 15 minutes to allow the pressure within the reactor to stabilize. The reactor was then allowed to cool to room temperature. Once at room temperature, the pressure of the reactor was recorded, and assumed to be due entirely the gas evolved from the sample. Assuming ideal gas behavior, the quantity of generated gas was calculated using a volume of 0.6 L, and the temperature and pressure within the reaction vessel. To characterize the composition of the gas within the reactor, the atmosphere of the system was vented to the calibrated mass spectrometer at a controlled rate using a mass flow controller (Brooks SLA5850).

After the post synthetic treatment and characterization of the HG material, the material is used in two different hydrogen generator prototype evaluations for proof of concept and scale. In the first evaluation a 600 mL Parr Bomb reactor is used as a hydrogen generator to initiate hydrogen gas evolution from the HG material. The Parr Bomb is calibrated at 23° C., 500° C., 550° C., and 600° C. using nitrogen. Temperature calibration is needed because the head of the reactor is not heated by the furnace, causing a temperature gradient throughout the reactor. Therefore, the temperature which the sample is heated to does not reflect the average temperature within the reactor. This difference was confirmed by Parr Instrument Company data. Accordingly, calibration with an inert gas is required before quantitative analysis can be carried out. The temperatures reported in bold font represent the programmed temperature the sample was heated to, while the temperature displayed in parentheses is the average temperature of the entire reactor determined by calibration. Herein, the calibrated temperatures are used to determine the amount of $H_2$ generated by the HG material.

Figure 6:
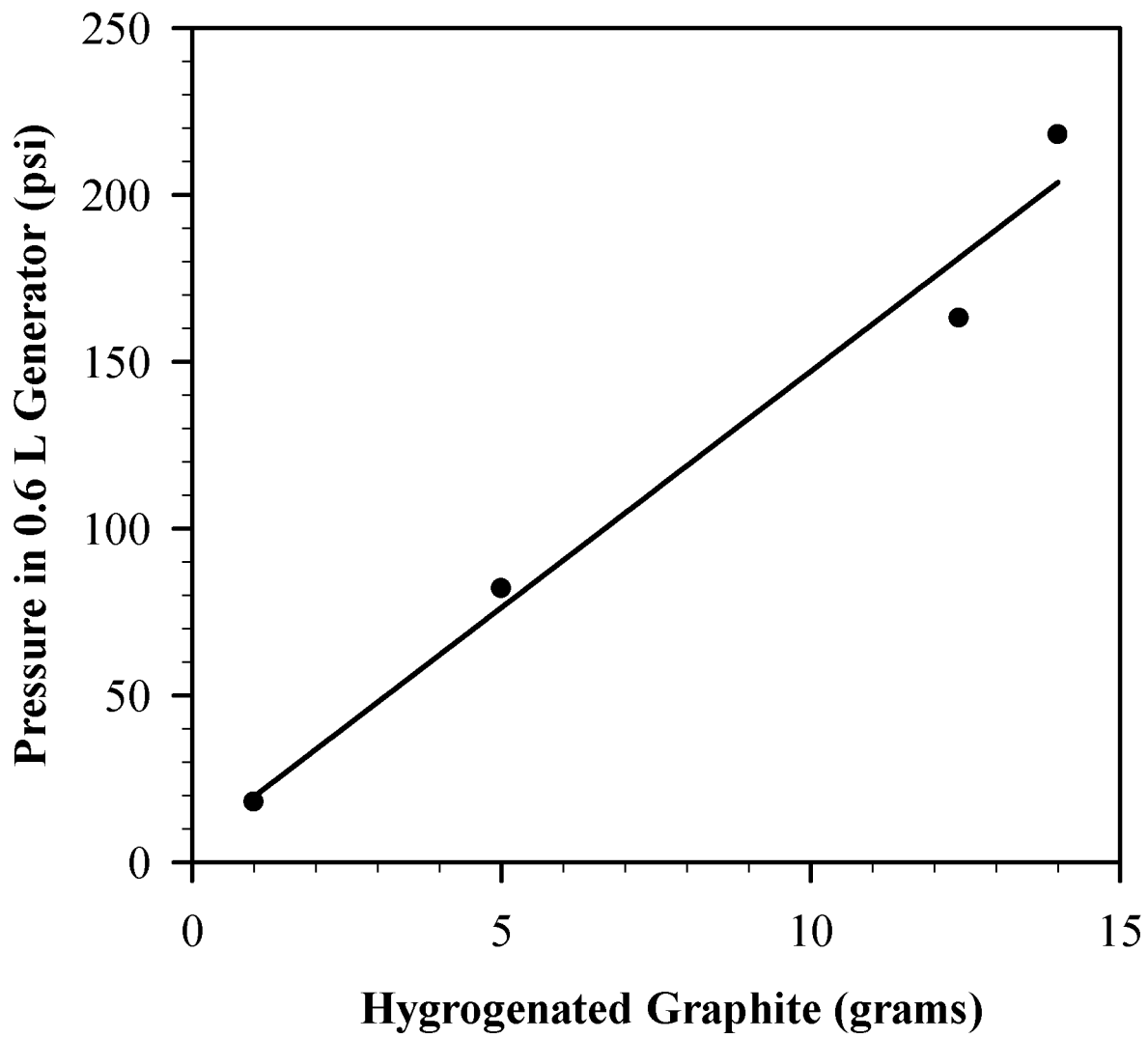
FIG. 6 shows pressure generated in the Parr Bomb as a function of different HG sample sizes heated to 500° C.

The Parr Bomb reactor is filled with 1 to 14 grams of HG and heated to 350° C. under vacuum for one hour. The vacuum is removed and the samples heated to 500° C. (Avg. 371.7° C.). FIG. 6 shows the pressure created in the hydrogen generator as a result of the evolution of the hydrogen from different HG sample sizes. The correlation between the hydrogen generation and HG sample mass suggests that HG scaling is linear.

These data are used to qualitatively calculate the approximate gravimetric and volumetric density of hydrogen removed from the HG material in the process by the ideal gas law in Eq. 1 where P=14.834 atm, V=0.600 L, T=644.83 K, and R is equal to 0.08206 (L atm)/(mol K):

$$PV=nRT \qquad (Eq. 1)$$

Approximately 0.168 moles of $H_2$ gas (0.3391 grams of hydrogen) was produced from 14 grams of HG at 500° C. (644.83K) (FIG. 6). Therefore roughly 2.4% of hydrogen by mass was removed from the HG material. While these results yielded only 31% of the theoretical amount of stored hydrogen in the HG (Table 2, 7.74%), FIGS. 3 and 4 indicate the material needs to be heated to higher temperatures ~575 to 600° C. to confidently determine the temperature at which all the bound hydrogen is thermally exfoliated from the crystal lattice.

Figure 7:
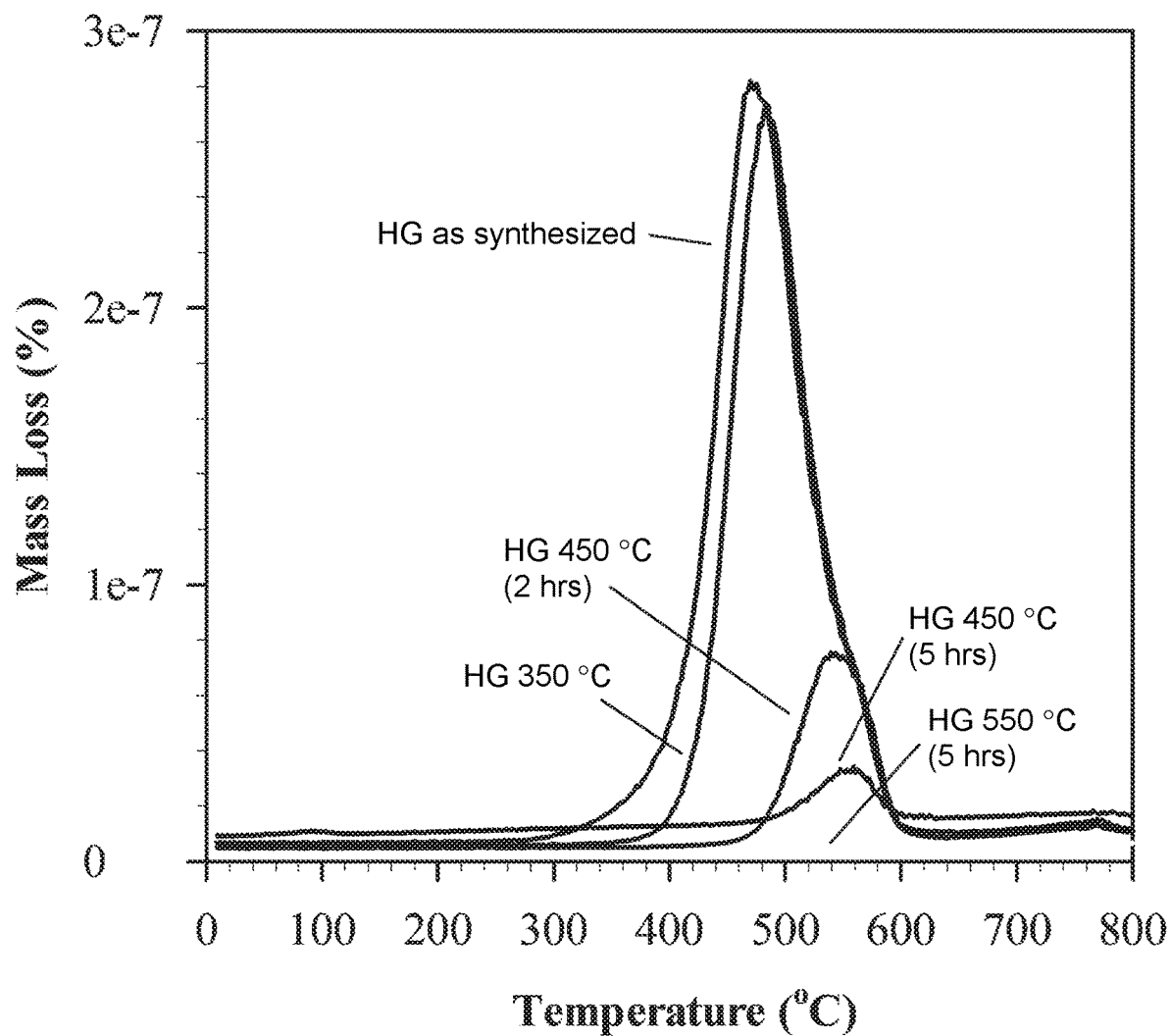
FIG. 7 shows TGA-MS of remaining hydrogen chemically stored in HG material following the controlled release of hydrogen from the material in the Parr Bomb.

The ability to control hydrogen release from the HG material in the hydrogen generator is demonstrated in FIG. 7. The hydrogen generator is filled with HG material and heated to 350° C. under vacuum for one hour. Hydrogen mass loss occurs between 375 and 600° C. (FIG. 4). Each sample is heated to a different temperature from 350 to 500° C. and held at that temperature for two hours (except where noted otherwise). The gas evolved in the hydrogen generator is vented to atmosphere. The material is removed from the hydrogen generator and measured by TGA-MS to determine the amount of hydrogen that remains chemically stored in the HG material. The curves demonstrate controlled release of hydrogen from HG as a function of temperature used to evolve the hydrogen. The higher the temperature the greater the hydrogen mass loss, which corresponds to less hydrogen detected by TGA-MS. These results are the first to demonstrate scaled-up production of HG material for on demand thermal hydrogen generation and the data further corroborates that higher temperatures or longer thermal exposure of the material to temperatures between ~500 and 600° C. are needed to completely remove the bound hydrogen from the HG material.

Figure 8:
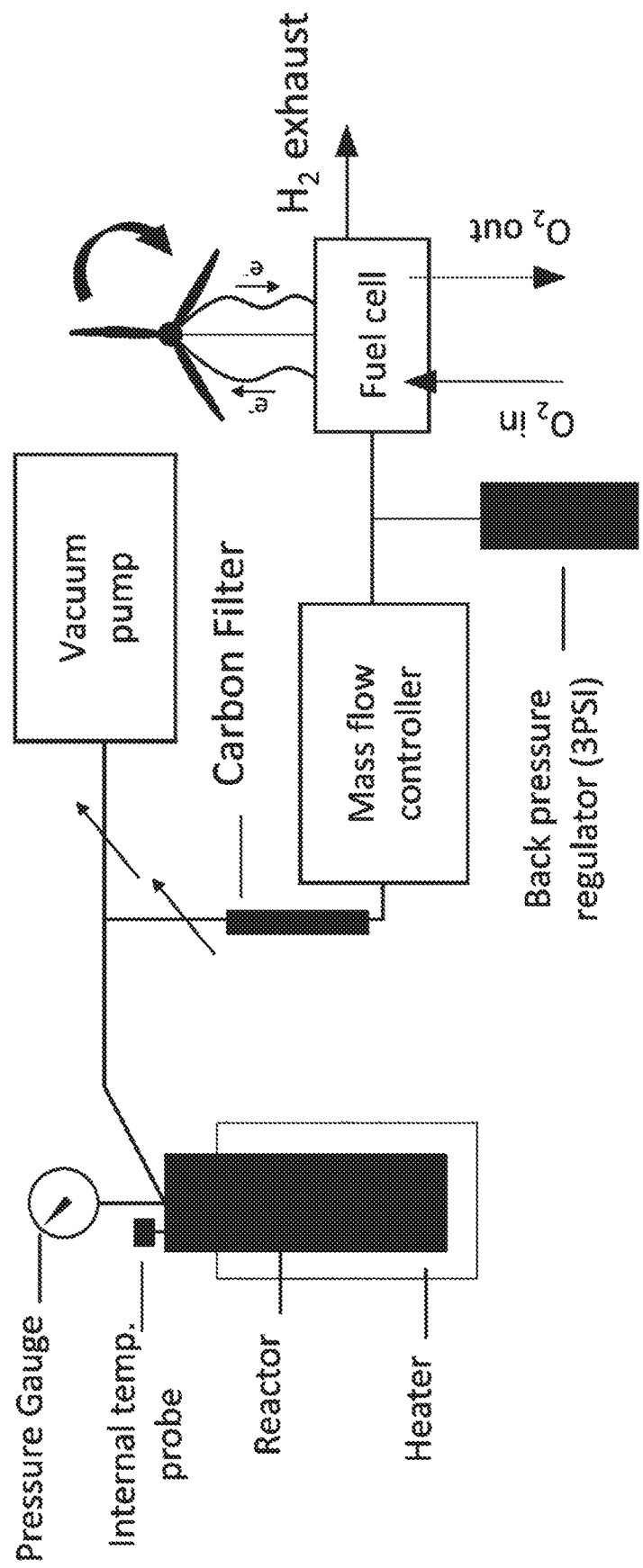
FIG. 8 shows a block diagram describing the thermal delivery of hydrogen to power PEM fuel cell.

FIG. 8 is a block diagram describing the thermal delivery of hydrogen to power a fuel cell that supplies the electricity to turn a turbine. Approximately 12.4 grams of large-scale synthesized HG was placed in the 600 mL hydrogen generator. The hydrogen generator was heated to 500° C. (Avg. 371.7° C.) and the hydrogen produced in the generator was passed through a carbon black filter to purify the hydrogen. The filtered hydrogen was fed to a PEM fuel cell module, along with an externally supplied oxygen stream. The hydrogen generator produced approximately 0.32 grams of hydrogen in less than 3 hours which generated 7 Watts of electricity from the PEM fuel cell to turn the turbine continuously. The approximate gravimetric energy density measured from the 0.0124 kg HG material in the fuel cell is determined as follows: 7 watts/1000 watts/kg*3 hours=0.021 kWh. 0.021 kWh/0.0124 kg=1.69 kWh/kg and a volumetric energy density of 3.83 kWh/L. Thus qualitatively 66% of the theoretical volumetric hydrogen storage density of graphite (Table 2) was used to operate the fuel cell. The results further support enhanced exfoliation of hydrogen as a function of thermal exposure time at lower temperature ~500° C. (Avg. 371.7° C.) (FIG. 6). In addition, the hydrogen generator demonstration assures the hydrogen gas thermally released from the HG material is sufficiently purified by the carbon black filter to be used to continuously operate and not contaminate or poison the catalyst of a PEM fuel cell. These results are the first to demonstrate an end to end process utilizing thermally generated hydrogen from scaled-up HG material in a pressure vessel.

The ability to control the hydrogen release of HG material from the hydrogen generator prototype and the thermal delivery of hydrogen to power a PEM fuel cell were all qualitative demonstrations and evaluations for proof of concept and scale. To quantitatively determine the gravimetric volumetric density of hydrogen removed from the HG material, the MS was calibrated using a blend of $N_2$, $CO_2$, $H_2$, and $CH_4$ of known composition. MS calibration for $H_2O$ and $NH_3$ vapors were performed using an $N_2$ stream saturated in the respective vapors, with response factors calculated using tabulated vapor pressures of the respective gasses.

Following the calibration of the MS the hydrogen generator was loaded with 2.48 grams of HG material as synthesized. The material was held under vacuum at 325° C. for 0.5 hours. The reactor was then isolated and heated to 550° C. (Avg. 412.4° C.) and held for 15 minutes before the pressure was recorded at 38 PSI (52.7 PSIA). The reactor was then vented to the mass spectrometer to characterize the composition of the effluent gas evolved from the HG material. When the gas is analyzed without the carbon filter, the effluent from the Parr reactor contains 87% $H_2$, 8% $CH_4$, 3.5% $NH_3$, 1.1% $H_2O$, and 0.4% $N_2$. When the carbon filter is applied under similar experimental conditions, the effluent gas is >then 99% $H_2$ gas (mol %). Table 3 summarizes the experimental conditions and the analysis of the effluent gas composition from different HG samples. A quantitative determination of the $H_2$ gravimetric density of the hydrogen removed from the HG materials is made using Eq. 1. The $H_2$ mass fraction for the samples are determined using the theoretical $H_2$ mass fraction for the same sample size and reported in Table 3.

TABLE 3

Hydrogen Storage in HG Materials

| Material | HG (grams) | PSIA 550° C. | $H_2$ (%) | $CH_4$ (%) | $NH_3$ (%) | $H_2O$ (%) | $N_2$ (%) | $H_2$ Theoretical loading (%) | $H_2$ Storage (wt %) |
|---|---|---|---|---|---|---|---|---|---|
| Vacuum Pretreated at to 325° C. | | | | | | | | | |
| Untreated HG | 2.48 | 52.7 | 87 | 8 | 3.5 | 1.1 | 0.4 | 35.0 | 2.71 |
| DCM wash | 4.88 | 113.7 | 92 | 4.2 | 2.1 | 0.5 | 1.2 | 40.6 | 3.14 |
| $H_2O$ Wash | 3.01 | 71.7 | 91.6 | 4.3 | 2.3 | 0.6 | 1.2 | 41.1 | 3.18 |
| Vacuum Pretreated at 23° C. | | | | | | | | | |
| Untreated HG | 2.45 | 59.7 | 88.2 | 5.2 | 3.1 | 0.94 | 2.3 | 40.7 | 3.15 |
| $H_2O$ Wash | 3.29 | 103.2 | 92.0 | 3.95 | 1.37 | 0.9 | 1.5 | 54.5 | 4.22 |
| $H_2O$ Wash (600° C.) | 1.26 | 43.7 | 89.2 | 4.08 | 1.50 | 1.18 | 3.13 | 55.1 | 4.26 |

Post synthetic purification techniques were used to improve $H_2$ loading of the HG materials as described above. Two samples were treated with HCl to remove the residual alkali metal. One HG sample ($H_2O$ wash) was rinsed in water to remove the access acid while the other HG sample (DCM wash) was rinsed in dichloromethane (DCM). Table 3 shows that the post acid treatment increase $H_2$ loading of the HG material and that $H_2O$ is the best solvent for acid removal. Comparing the untreated HG sample to the post treated sample rinsed in water shows an approximate 17% increase in $H_2$ loading. The maximum theoretical amount of stored hydrogen in the HG achieved was 41.4%. It is also worth noting that the quantitative $H_2$ loading determined from the untreated HG sample (35%) is only 13% higher than the qualitative measurements previously made that determined an $H_2$ loading of 31% using data from FIG. 6.

These storage values are improved even further when the samples are not pre-vacuumed for 0.5 hours at 325° C. Table 3 shows that when the samples are held under vacuum at room temperature for 15 minutes and then heated to 550° C. (685.58 K) and 600° C. (729.05 K), $H_2$ loading is increased from 41.1% to 55.1%. The $H_2$ storage capacity of the HG material measured 4.26 wt % compared to the 7.74 theoretical wt %, a 34% increase in $H_2$ storage capacity. These values suggest that a heated vacuum environment lowers the temperature range of $H_2$ release from the HG material and suggests the material should not be substantially heated under vacuum before it is applied for hydrogen storage applications.

In addition to thermal release of hydrogen from the HG material, microwaves (MW) are used as an alternative energy source to release the hydrogen from the HG material. Microwaves are known for internal and volumetric heating of materials in a variety of scientific applications including organic synthesis and in the preparation of catalysts (Hu et al., *Carbon* 2012, 50, 3267-3273). Microwaves deliver energy directly to a material at the speed of light and it is much faster than conventional heating. Carbon-based materials such as graphene respond to microwave energy by interfacial polarization (Kim et al., *Carbon Letters* 2014, 15, 15-24).

Carbon based materials contain π-electrons that are free to move in a delimited region of the material, inducing a current that travels in phase with the electromagnetic field. Since the electrons cannot couple to the changes of phase of the electric field, energy is dissipated in the form of heat due to the so-called Maxwell-Wagner effect (Menendez et al., *Fuel Processing Technology* 2010, 91, 1-8).

Figure 9A:
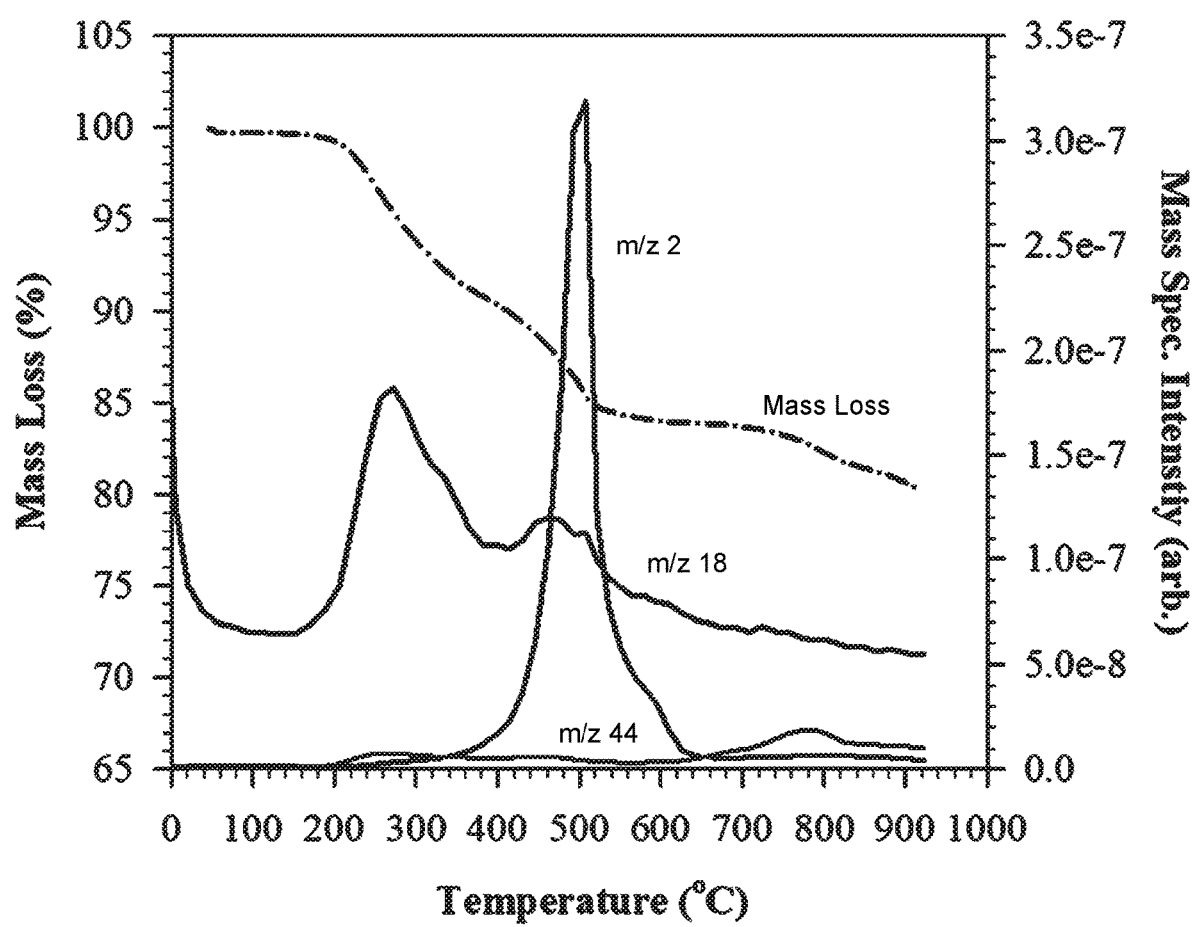
FIG. 9A shows TGA-MS of HG material exposed to 1200 watts of microwave for 2 minutes.
Figure 9B:
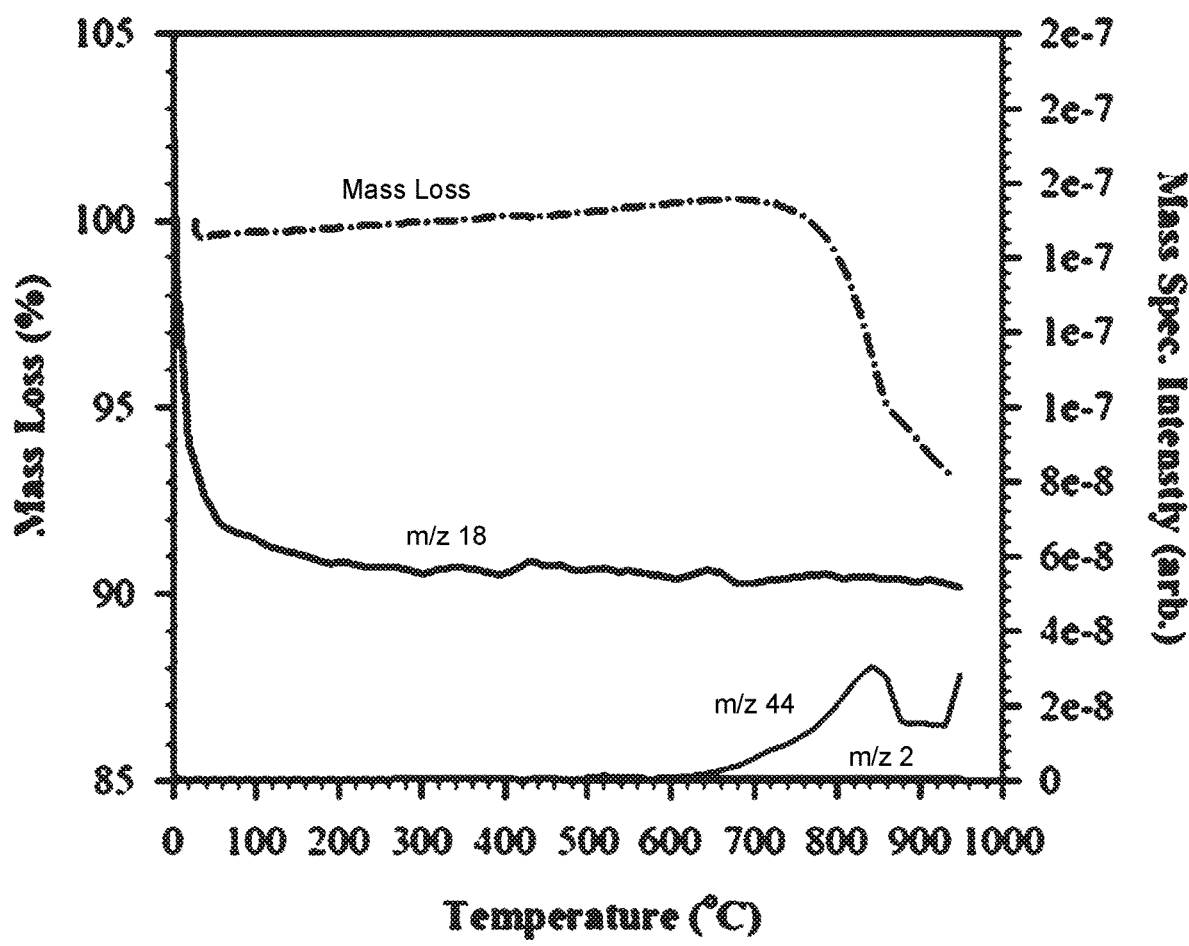
FIG. 9B shows TGA-MS of HG material exposed to 1200 watts of microwave for 10 minutes.
Figure 9C:
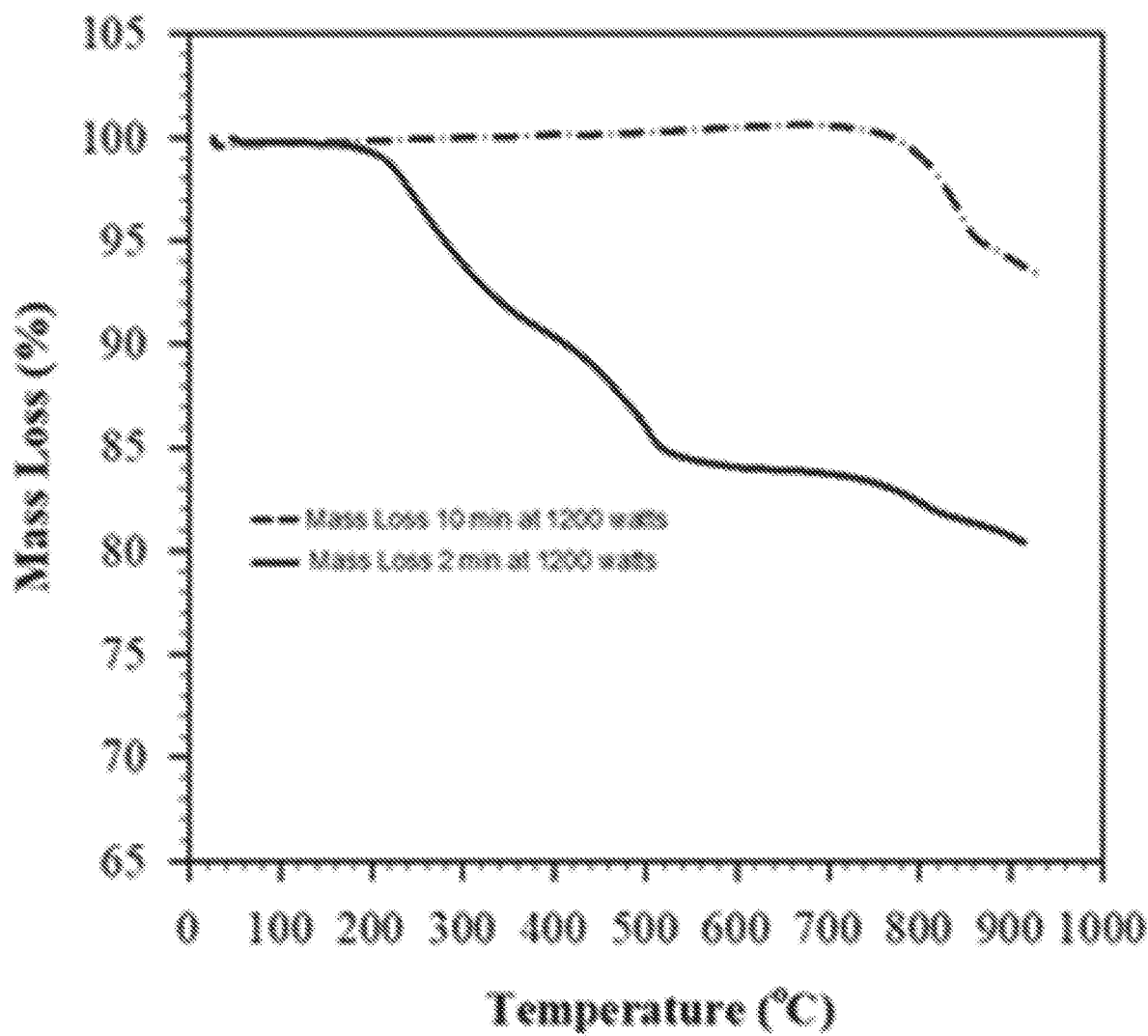
FIG. 9C shows TGA graph comparing mass loss of HG material exposed to 1200 watts of microwave energy at the two different time intervals.
Figure 10:
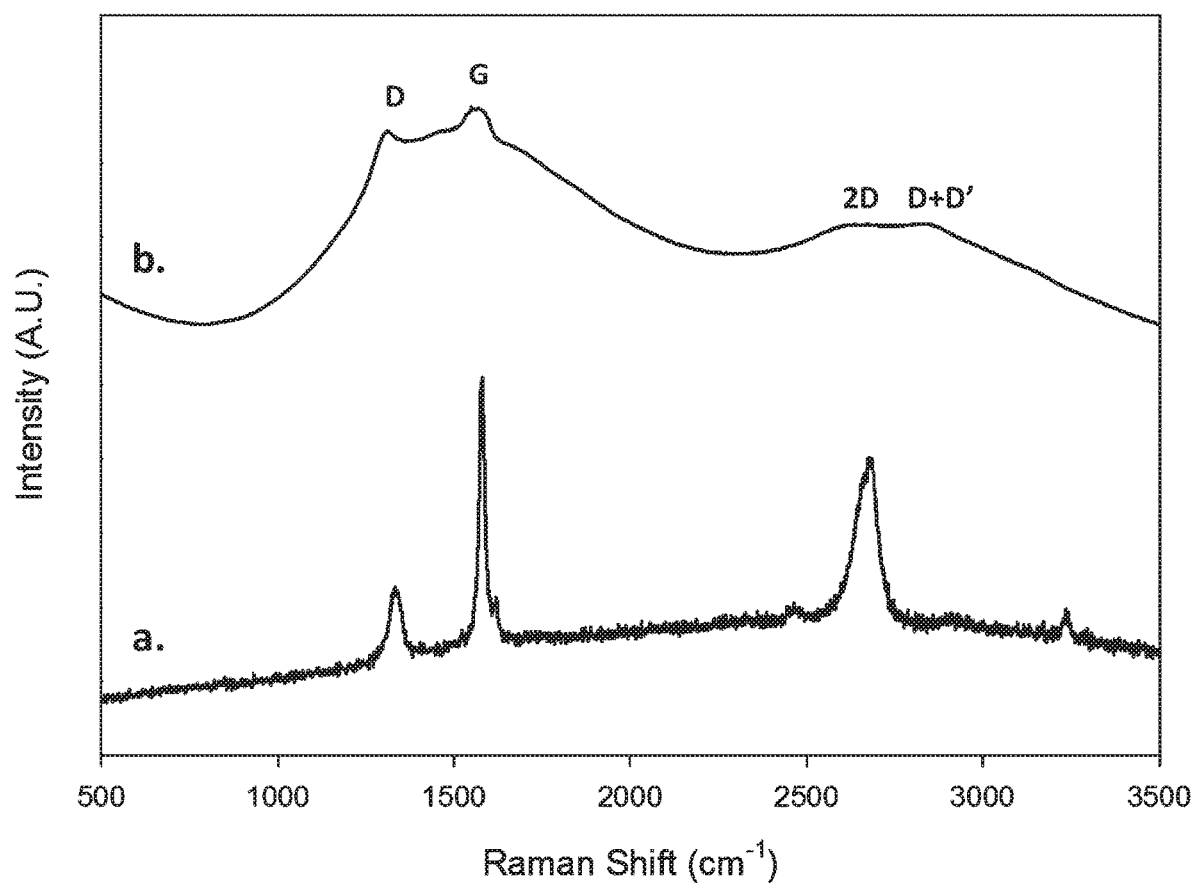
FIG. 10 shows Raman spectra of (a) graphite precursor and (b) hydrogenated graphene.

The microwave irradiation induces molecular vibrations within hydrogenated graphene, heating the material and resulting in the release of hydrogen. FIG. 9A shows the TGA data of the HG material after the material is exposed to 1200 watts of microwaves for 2 minutes. The analysis of the weight loss curve by the in-line mass spectrometer after exposure to the microwaves indicates that water and hydrogen remained chemically bound in the HG material. When the HG material is exposed to the same microwave energy (1200 watts) for 10 minutes, FIG. 9B shows all the hydrogen and water are thermally released from the HG material. FIG. 9C directly compares the TGA weight loss curves for the HG material after exposure to microwaves (1200 watts) at the two different time intervals. These preliminary results indicate that microwave thermal release could be a very effective method both in the terms of time and energy for the complete release of hydrogen from hydrogenated graphene. Such a technique could lead to further refinement of controlled release of hydrogen from HG.

Finally, the chemical release of hydrogen has the advantage of being energy favorable. No other external heat is needed to achieve the release of hydrogen. This could potentially decrease the total weight while not taking from the potential energy yield from the release of hydrogen. Some examples of chemicals capable of hydrogen exfoliation from hydrogenated graphene include con. Sulfuric and con. Nitric acid. Upon contact with HG both of these acids immediately start to exfoliate the hydrogen.

The process demonstrates the scaled-up synthesis of inexpensive, user friendly, safe, stable, pressure-tolerant solid hydrogen storage material. The HG material is used to continuously operate a PEM fuel cell by the controlled exfoliation of hydrogen gas from the carbon lattice using thermal or microwave energy. The hydrogen gas requires minimal energy to purify and the exfoliated material is recyclable.

FIG. 9 shows Raman spectra collected for the graphite starting material and hydrogenated graphene sample. The graphite starting material exhibits three well defined peaks corresponding to the characteristic D, G, and 2D bands of graphite at 1330, 1580 and 2680 $cm^{-1}$, respectively. Following hydrogenation, the D and G bands become enveloped by a strong photoluminescent background, characteristic of band gap splitting due to hydrogenation of the graphite precursor. Despite the strong background luminescence, a clear increase in the relative intensity of the D band is observed for the hydrogenated sample, indicative of disruption of the $sp^2$ hybridized carbon network, due to the formation C—H bonds. Finally, the hydrogenated sample also displays an additional peak at 2850 $cm^{-1}$, corresponding to the D+D' combination band, which has also been attributed to chemical hydrogenation.

Figure 11:
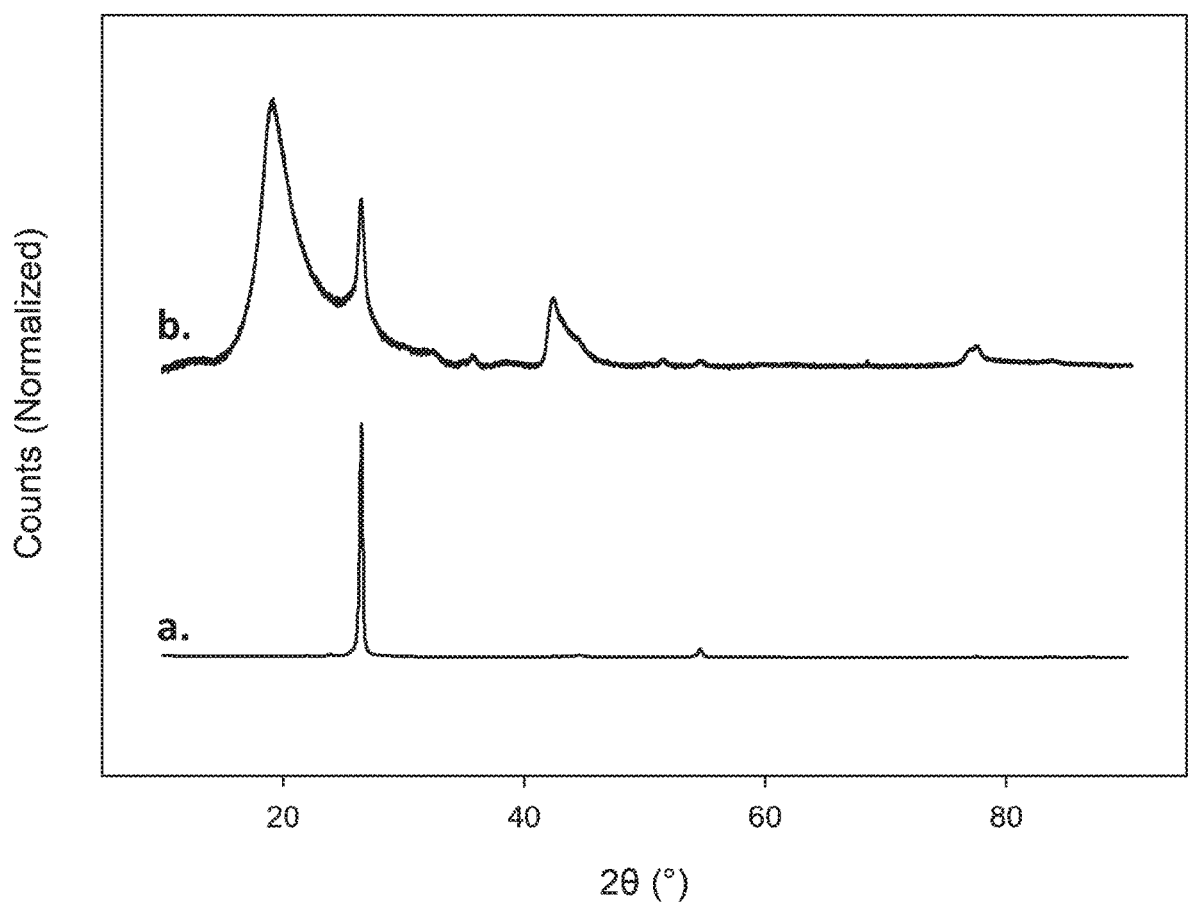
FIG. 11 shows X-ray diffraction patterns for (a) graphite precursor and (b) hydrogenated graphene.

FIG. 11 displays X-ray diffraction patterns for both the graphite starting material as well as the chemically hydrogenated graphene. The most notable difference between the graphite precursor and the hydrogenated sample is the characteristic shift and broadening of the (002) reflection from 26.6 to 18.8° 2θ, indicating an increase in the d-spacing between the carbon sheets due to hydrogenation of the carbon lattice. The hydrogenated sample also displays two peaks at roughly 42 and 77° 2θ corresponding to the (100) and (110) reflections of graphite, respectively. The relative intensity of these reflections are most likely enhanced due to a change in the preferred orientation caused by disruption of planar graphite structure upon hydrogenation, similar to what has been observed for oxidized graphite samples. It should be noted, the hydrogenated graphene sample still exhibits a reflection at 26.6° 2θ, indicating incomplete hydrogenation of the graphite precursor.

In addition to a large gravimetric $H_2$ storage capacity, viable forms of $H_2$ storage should also possess a large volumetric $H_2$ density. To date, the bulk crystal structure of graphane has only been theoretically modeled. Although the isomeric conformation (chair vs boat) and three dimensional stacking of bulk graphane has yet to be empirically verified, the bulk density of a pristine sample may still be reasonably approximated using current diffraction data. The hydrogenation of bulk graphite is known to increase the interlayer spacing between carbon sheets from 3.36 Å to approximately 4.87 Å, while also inducing slight in-plane compression. Using these generally accepted values, the crystal structure of graphite can be adapted to provide reasonable estimation of lattice parameters for bulk graphane, which are listed in Table 4. From these values, a bulk density of 1.75 kg $L^{-1}$ is obtained, which corresponds to a volumetric $H_2$ storage capacity of 135 g $L^{-1}$ for a fully hydrogenated sample. These estimates are well above the DOE's ultimate target $H_2$ storage capacity of 50 g $L^{-1}$ for lightweight vehicles.

TABLE 4

Estimated lattice parameters for graphane, extrapolated using the established unit cell of highly crystalline graphite

|  | Graphite | Graphane |
| --- | --- | --- |
| Space group | P63/mmc (194) | N.A. |
| α | 2.4617 (2) | 2.42 |
| c | 6.7106 (4) | 9.74 |
| γ | 120 | 120 |
| Z | 4 | $4^a$ |

$^a$Z now corresponds to the unit (C—H)

To compare this estimated density to the bulk hydrogenated graphene, the sample was compressed using a pellet press at a force of 2 tons for a total of 10 minutes. The density of the pelletized sample was measured to be 1.35 kg $L^{-1}$, corresponding to roughly 77% of the estimated density of pure graphane, demonstrating hydrogenated graphene can be easily packed in its bulk form.

Figure 12:
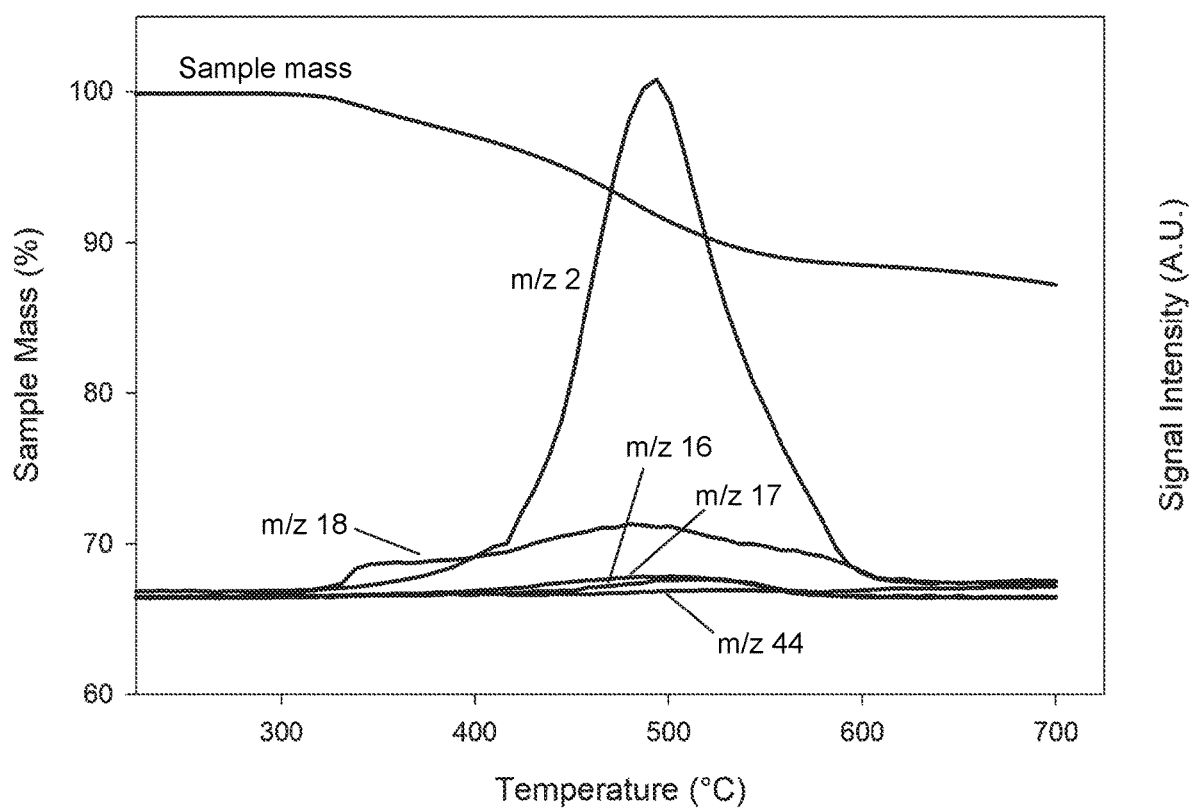
FIG. 12 shows TGA mass loss profile for the hydrogenated graphene along with select mass fragments detected by in-line mass spectrometry.

To characterize the thermal decomposition of the hydrogenated graphene, thermogravimetric analysis coupled with mass spectrometry (TGA-MS) was employed. FIG. 12 shows the mass loss profile for the hydrogenated graphene material, overlapped with the significant mass fragments detected during the TGA-MS run. Upon heating the sample to 700° C., about 12% of the sample's total mass is lost, with the majority of the mass lost between the temperatures of 350 to 600° C. Hydrogen gas corresponds to the mass fragment m/z 2, which dominates the mass profile, and unambiguously demonstrates a high degree of chemical hydrogenation of the graphite precursor.

FIG. 12 also displays mass fragments of m/z 16, 17, 18, and 44, which correspond to methane, ammonia, water, and carbon dioxide, respectively. The generation of methane, ammonia, and water vapor is most likely caused by the thermal decomposition of other functional groups incorporated into the graphene background during the synthesis and workup of the material, while the generation of carbon dioxide most likely corresponds to the thermal decomposition of residual $Li_2CO_3$ species leftover as a byproduct of the birch reduction. During the thermal decomposition of bulk hydrogenated graphene, the generation of minority byproduct gases such as these are to be expected, and similar results have been observed by previous authors.

The above characterizations clearly demonstrate that the large-scale Birch reduction successfully functionalizes graphite with covalently bound hydrogen, and that this hydrogen can be thermally liberated from the carbon lattice at temperatures above 400° C. In further experiments to unambiguously quantify the extent of hydrogen functionalization, and thus the $H_2$ loading of the material, multiple grams of the hydrogenated graphite were thermally decomposed in a sealed pressure reactor heated by a ceramic furnace. The evolved gas was then fed to a mass spectrometer, to determine composition.

To quantify the hydrogen content of hydrogenated graphene sample, a known mass of hydrogenated graphene was added to the reactor, and then held under vacuum and at room temperature for 30 minutes. Next, the valve to the vacuum pump was closed to isolate the pressure reactor, which was then heated to 600° C. and held for an additional 15 minutes. The reactor was then allowed to cool to room temperature, and the final pressure of the system was recorded and used to calculate the quantity of gas within the reactor. Following the pressure measurement, the contents of the reactor were vented to the mass spectrometer, in order to quantify the gas composition.

Table 5 provides calculated values for the gas composition and $H_2$ loading capacity of the hydrogenated graphene sample after heating to 600° C. within the pressure reactor. The gaseous contents within the reactor were composed 90.2% $H_2$, with remainder of the gas consisting of methane, ammonia, and water, consistent with the TGA-MS results provided in FIG. 12. The hydrogen released during these experiments was found to correspond to an $H_2$ loading capacity of 3.2 wt. % (42% of the theoretical $H_2$ loading capacity predicted for a fully hydrogenated sample).

TABLE 5

Gaseous composition within the pressure reactor after thermally decomposing the hydrogenated graphene sample

| | $H_2$ | $CH_4$ | $NH_3$ | $H_2O$ | $H_2$ Loading Capacity (wt. %) |
|---|---|---|---|---|---|
| Hydrogenated Graphene Composition (%) | 90.2 | 6.1 | 2.5 | 1.2 | 3.2 |

Figure 13:
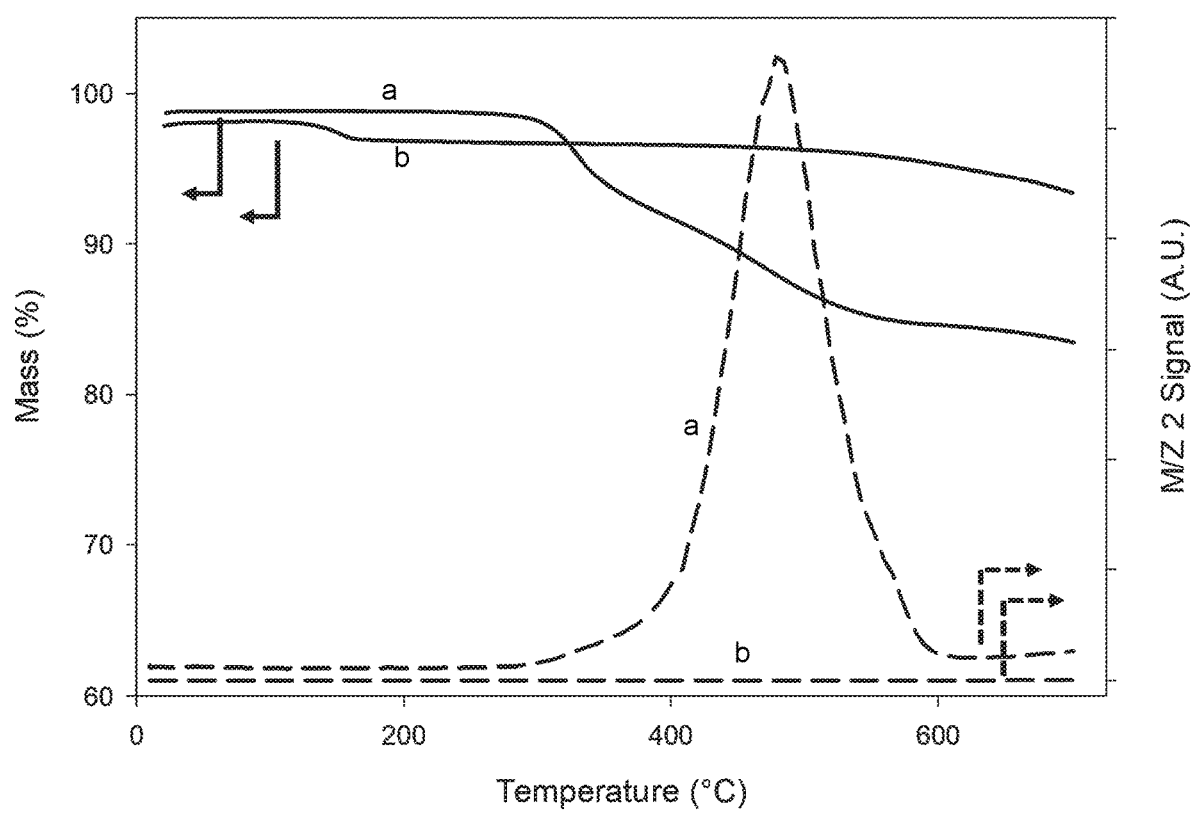
FIG. 13 shows TGA mass loss profiles for the hydrogenated graphene along with mass fragment m/z 2 for the hydrogenated graphene (a) before and (b) after temperature programmed decomposition.

To verify these experimental conditions were sufficient to liberate the majority of covalently bound hydrogen, the resulting "depleted" hydrogenated graphite was characterized by TGA-MS. FIG. 13 displays the mass loss profile and consequent MS signal corresponding to m/z 2 for the hydrogenated graphene before and after thermal decomposition in the pressure reactor. For the "depleted" sample, minimal mass loss was observed up to 600° C., and no significant signal at m/z 2 was observed, demonstrating the vast majority of hydrogen had been liberated from the sample. A mass loss of about 1% is observed for the "depleted" sample at about 135° C., which is not observed for the original hydrogenated sample. Subsequent MS analysis demonstrated this mass loss coincided with the evolution of ammonia and carbon dioxide gas. This is consistent with the decomposition of ammonium carbonate, which most likely formed as a byproduct during the decomposition of the hydrogenated graphene within the reactor, and explains why no appreciable carbon dioxide signal was observed during the pressure reactor experiment described in Table 5.

While the above experiments demonstrate successful storage and release of high-density hydrogen fuel, it is important to note that efficient and sustained fuel cell operation requires high purity $H_2$ gas. The presence of additional gases upon decomposition of the hydrogenated graphene, therefore, may present additional challenges in the application of the material as a fuel source. The generation of ammonia gas is particularly concerning, as it is known to degrade and poison fuel cell components. To address this, an in-line, packed carbon filter was employed to directly purify the evolved hydrogen gas. Following the same experimental protocol outlined for Table 5, the hydrogenated graphene sample was decomposed. Upon application of the packed carbon filter, the effluent gas was found to consist of >99% $H_2$.

Following the successful generation, quantification, and purification of hydrogen gas from bulk hydrogenated graphene, the material was demonstrated as functional power source. To accomplish this, the pressure reactor was used as a prototype hydrogen storage and delivery system, and connected to a commercially purchased PEM fuel cell. Briefly, 12 g of hydrogenated graphene was added to a pressure reactor, which was linked in series to a carbon filter, mass flow controller and finally fed into the PEM hydrogen fuel cell. Following the same procedures outlined in Table 2, the pressure reactor was sealed under an evacuated atmosphere, and then heated to 600° C. After 15 minutes, the contents of the reactor were purified and fed into the fuel cell at a rate of 5 mL min$^{-1}$. Under these conditions, the fuel cell successfully operated uninterrupted for over 3 hours, before being manually shut off. FIG. 8 provides a diagram of the experimental setup.

The following describes a variety of protocols that may be used for generating the hydrogenated graphene and the hydrogen gas.

Synthesis—The preparation of hydrogenated graphene is via the exfoliation of graphite to graphene and reduction of graphene by radical reaction with alkali metals (Schafer et al., *Angew. Chem. Int. Ed.* 2013, 52, 754-757; Yang et al., *J. Am. Chem. Soc.* 2012, 134, 18689-18694). The exfoliation of graphite is achieved using ultrasonic wave pulses. These waves can be introduced via an external bath or internal probe sonicator. The sonication of graphite before and after the addition of alkali metals increases the total percentage of hydrogenation of hydrogenated graphene to the theoretical limit of 7.7% by weight. It is also possible to sonicate after the addition of the alkali metal only and achieve similar results.

Representative Procedure—$NH_3$ (150 mL, Matheson) was condensed under an argon or nitrogen atmosphere at −78° C. Graphite (225 mg, Sigma Aldrich) was added, followed by sonication (Qsonica Probe/Q700) for two hours at 40 amps on a 30-second on/30-second off cycle with stirring. The reaction was maintained at −78° C., and Li (400 mg, Alfa Aesar) was added to the flask, followed by sonication and stirring as before. Water (3 mL, DI), methanol (7.1 mL, Sigma Aldrich), ethanol (9.5 mL, Sigma Aldrich), or TBA (16 mL, Sigma Aldrich) was degassed by bubbling $N_2$ for 30 minutes then subsequently added drop wise via syringe. The reaction was stirred overnight. The resulting grey solid was suspended in a solution of water (200 mL), and HCl (Fisher Scientific) was added until the sample was slightly acidic (pH ~6). The HG is diluted with water and filter through a membrane filter with copious amount of water until the elute is pH neutral. The product was scraped from the membrane and furthered dried in a vacuum oven at 220° C. and 1 Torr overnight. It is important to note that further product purification is necessary. This reaction has been scaled up to 100 g scale in a 3 L custom made flask. The reactants scale appropriately and a 1 inch diameter probe is used at 50 amp at the 100 g scale.

For reaction cleanup and product purification, the hydrogenated graphene solution is suspended in water and filtered through polymer membranes. Depending on the pH of the solution various polymers membranes can be used. If no acidification of hydrogenated graphene is preformed following the reaction, hydrogenated graphene can be suspended in water and filtered through a membrane applicable for strong basic solutions. If hydrogenated graphene is acidified with acid, neutralizing some of the base of the by products produced during the hydrogenation process, then a membrane applicable to acid conditions is used.

The exfoliation of graphite to graphene increases the total hydrogen yield by enhancing the intercalation of lithium for more complete coverage of radicals resulting in increased hydrogenation of graphene. This procedure has been shown to have percent hydrogenation approaching the maximum theoretical value of 7.7% hydrogen by weight. This is achieved by the induction of ultrasonic waves. The strong vibration forces break the Van der Waals forces holding the layers of graphite together resulting in the exfoliation of graphite to graphene.

The total yield of the reaction is increased by the use of acids that neutralize bases produced from the reaction. The hydrogenated graphene solution can then be diluted with water and filtered through polymer membranes. These membranes both cut down on time of clean up as well as increase total yield by decreasing the loss of product from transfer used in the traditional method work up process involving a phase separation dilution separation.

Clean Up—Strong Acids—The hydrogenation process has been shown to produce a few unwanted side products. These consist of carbonate species, strong bases, as well as graphene oxide. This is made evident in the thermal gravimetric analysis—mass spectrometry showing graphene oxide before the loss of hydrogen and carbonate loss after the loss of hydrogen. These byproducts are not only unwanted as they decrease the gravimetric density of the material, but also release potentially harmful gases to the applications such as fuel cells. The byproducts also decrease the overall percent yield by weight of hydrogen in hydrogenated graphene, increasing the total weight of hydrogenated graphene.

Sulfuric acid is a strong acid, which is capable of exfoliating graphite to graphene at various concentrations with simple stirring. The hydrogenated graphene is further purified by suspension in varying concentrations of sulfuric acid accompanied with gentle stirring. The purified hydrogenated graphene will drop out of solution upon the halting of stirring. In turn the exfoliated graphene releases all trapped contaminates which the acid environment subsequently neutralizes. The acid can then be decanted and hydrogenated graphene diluted with water and filtered with copious amounts of water until waste is pH neutral.

Phosphoric acid is a strong acid, which is capable of exfoliating graphite to graphene at various concentrations with simple stirring. The hydrogenated graphene is further purified by suspension in varying concentrations of phosphoric acid. The purified hydrogenated graphene will drop out of solution upon the stopping stirring. In turn the exfoliated graphene releases all trapped contaminates which the acid environment subsequently neutralizes. The acid can then be decanted and filtered.

Hydrochloric acid is a strong acid, which is capable of exfoliating graphite to graphene at various concentrations with simple stirring. The hydrogenated graphene is further purified by suspension in varying concentrations of hydrochloric acid. The purified hydrogenated graphene will drop out of solution upon the stopping of stirring. In turn the exfoliated graphene releases all trapped contaminates which the acid environment subsequently neutralizes. The acid can then be decanted. Hydrogenated graphene is then diluted and filtered with copious amounts of water until waste is pH neutral.

Typical procedure—HG (300 mg) was placed into a round bottom flask. Followed by 100 mL of hydrochloric, nitric acid, acetic acid, phosphoric acid, or sulfuric acid. Both concentrated and dilute acids were attempted with a total volume of 100 mL in all cases unless otherwise stated. The reactions were carried out for varying time periods from overnight to a week. After completion the stirring is stopped and the HG is allowed to settle. The acid is decanted and disposed of properly. The HG is diluted with water and filter through a membrane filter with copious amount of water until the elute is pH neutral. The product was scraped from the membrane and furthered dried in an oven vacuum at 220° C. overnight. It is important to note that this clean-up process is easy to scale as the need for larger clean-up is needed.

Acid plus iron—Acids are a capable of exfoliation and purification of hydrogenated graphene. The addition of iron metal powder can decrease the concentration of acid required for the same results with simple stirring. This works exceptionally well with acids like HCl. This effort is also observed in acids such as phosphoric, sulfuric, and nitric acid etc., in many cases being able to reduce the concentration of acid in half After reduction the hydrogenated graphene is allowed to fall from solution and the excess acid is decanted off. The suspension is the diluted with water and filtered through a polymer membrane. The product is washed with copious amounts of water until the elute is pH neutral. It is also possible to skip the decanting step and simply dilute and filter but will resulting in increased waste.

Ultrasonication—Upon completion of the reaction, ammonia is trapped with byproducts between the molecular layers of hydrogenated product. The byproducts are primarily carbonates and bases, which are soluble in water and fully released from the molecular layers by ultra-sonication. The use of ultrasonic waves for the purification of hydrogenated graphene can be achieved by bath or probe sonication. The intensity of the wave pulses dictates the time needed with higher intensity decreasing the time needed to exfoliate graphite and solubilize the byproducts. After completion hydrogenated graphene is allowed to fall from solution and excess water decanted, followed by filtration and washing to copious amount of water until the elute is pH neutral. This can also be achieved by simple filtrate but will result in increased waste production. This is an environmentally friend method for the purification of hydrogenated graphene. Ultra-sonication can achieve ultrahigh purity hydrogenated graphene without the need of harsh chemicals. This cuts down on waste.

Release of hydrogen—The release of hydrogen can be achieved by several methods: microwave, chemical, and thermal. The system is also envisioned with an oxygen generator as a sub-component of the entire system (for environments such as underwater or outer space where oxygen is not present or in short supply).

Microwave—Hydrogenated graphene under microwave radiation releases chemically bound hydrogen from the lattice. This can be achieved with a conventional microwave at low wattage. The higher the wattage, the lower the time interval needed for the complete release of hydrogen from hydrogenated graphene.

The use of microwaves in order to release hydrogen from hydrogenated materials can be achieved with a conventional microwave in seconds. These materials include metal hydrides, hydrogenated graphene, along with physically absorbed hydrogen. The microwave induces vibrations within hydrogenated graphene. These vibrations heat up the hydrogenated graphene resulting in the exfoliation of hydrogen. The use of microwave is adventitious because of the rapid release of hydrogen. The ability of microwaves to penetrate deep into hydrogenated graphene when in bulk with no additional clean up steps needed after the release of hydrogen from hydrogenated graphene. The samples tested were often relieved of hydrogen on under 10 sec depending on wattage used. This is a very effective method both in the terms of time and energy for the complete release of hydrogen from hydrogenated graphene.

Chemical—Strong acids as well as strong reducing agents can be employed to release hydrogen from hydrogenated graphene. The reducing nature of acids, completely releases the hydrogen resulting in hydrogen gas plus graphite when used on hydrogenated graphene. These acids include but are not limited to concentrated nitric acid and concentrated sulfuric acid. This is achieved in short order by making a simple suspension of hydrogenated graphene in acid. The quick process resulting in vigorous bubbling and the release of all hydrogen from hydrogenated graphene.

Chemical release of hydrogen has the advantage of being energy favorable. No other external heat is needed to achieve the release of hydrogen. This could potentially decrease the total weight while not taking from the potential energy yield from the released hydrogen. Some examples of chemicals capable of hydrogen exfoliation from hydrogenated graphene include con. sulfuric and con. nitric acid. Upon contact with hydrogenated graphene both of these acid immediately start to exfoliate the hydrogen.

Thermal—Hydrogenated graphene has three distinctive regions of thermal mass loss. This is observed using a TGA-MS. The first stage is contributed to the loss of graphene oxide and trapped solvents from 0 to 375° C. This is followed by the second stage primarily consisting of hydrogen from 376-600° C. The final stage from 601-1000° C. is attributed to the mass loss of carbonate species. As hydrogenated graphene is heated, the energy is transferred to the bonds and when enough energy is applied, the bond breaks resulting in the release of gases such as hydrogen. The thermal source can be of any type: electric, chemical, radioactive, steam, microwave, etc.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
providing a hydrogenated $sp^2$ carbon allotrope comprising hydrogen covalently bound to a carbon allotrope;
wherein the hydrogenated $sp^2$ carbon allotrope comprises at least 5.5 wt % of the hydrogen covalently bound to the carbon allotrope; and
releasing hydrogen gas from the hydrogenated $sp^2$ carbon allotrope.

2. The method of claim 1, wherein the carbon allotrope is graphene or graphite.

3. The method of claim 1, wherein the carbon allotrope is a fullerene or carbon nanotubes.

4. The method of claim 1, wherein the hydrogen gas is released by heating the hydrogenated $sp^2$ carbon allotrope.

5. The method of claim 4, wherein the heating is performed in a reactor having an external heat source.

6. The method of claim 5, wherein the reactor is a pressurized vessel.

7. The method of claim 4, wherein the heating is performed by a chlorate candle.

8. The method of claim 1, wherein the hydrogen gas is released by irradiating the hydrogenated $sp^2$ carbon allotrope with microwave radiation.

9. The method of claim 1, wherein the hydrogen gas is released by treating the hydrogenated $sp^2$ carbon allotrope with a substance that chemically removes the hydrogen.

10. The method of claim 9, wherein the substance is concentrated sulfuric acid or concentrated nitric acid.

11. The method of claim 1, wherein the hydrogen gas is released at a controlled rate.

12. The method of claim 1, wherein the releasing the hydrogen gas further comprising: directing the hydrogen gas into a fuel inlet of a fuel cell capable of using hydrogen gas as fuel.

13. The method of claim 12, further comprising:
directing the hydrogen gas through a carbon filter before it enters the fuel cell.

14. The method of claim 1, wherein the carbon allotrope comprises at least 7.5 wt % of the hydrogen covalently bound to the carbon allotrope.

* * * * *